(12) United States Patent
Takami et al.

(10) Patent No.: US 10,559,854 B2
(45) Date of Patent: Feb. 11, 2020

(54) SECONDARY BATTERY, BATTERY PACK, AND VEHICLE

(71) Applicant: KABUSHIKI KAISHA TOSHIBA, Minato-ku (JP)

(72) Inventors: Norio Takami, Yokohama Kanagawa (JP); Hayato Seki, Kawasaki Kanagawa (JP); Shinsuke Matsuno, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 232 days.

(21) Appl. No.: 15/692,347

(22) Filed: Aug. 31, 2017

(65) Prior Publication Data

US 2018/0277885 A1    Sep. 27, 2018

(30) Foreign Application Priority Data

Mar. 21, 2017    (JP) .................................. 2017-054571

(51) Int. Cl.
*H01M 10/058*  (2010.01)
*H01M 10/052*  (2010.01)
(Continued)

(52) U.S. Cl.
CPC ......... *H01M 10/058* (2013.01); *H01M 4/485* (2013.01); *H01M 6/045* (2013.01); *H01M 10/049* (2013.01); *H01M 10/052* (2013.01); *H01M 10/054* (2013.01); *H01M 10/0568* (2013.01); *H01M 2220/20* (2013.01); *Y02E 60/122* (2013.01); *Y02T 10/7011* (2013.01)

(58) Field of Classification Search
CPC combination set(s) only.
See application file for complete search history.

(56) References Cited

U.S. PATENT DOCUMENTS 6,403,253 B1    6/2002  Wainwright et al.
2004/0258995 A1*  12/2004  Costanzo .............. H01M 4/244
                                                       429/229

(Continued)

FOREIGN PATENT DOCUMENTS

JP    9-508490       8/1997
JP    2000-77073 A   3/2000
(Continued)

OTHER PUBLICATIONS

S. Liu, et al., "Rechargeable Aqueous Lithium-Ion Battery of TiO2/LiMn2O4 13 with a High Voltage", Journal of the Electrochemical Society, 158(12) A1490-A1497 (2011).

(Continued)

*Primary Examiner* — Christopher P Domone
(74) *Attorney, Agent, or Firm* — Oblon, McClelland, Maier & Neustadt, L.L.P.

(57) ABSTRACT

According to one embodiment, a secondary battery includes a positive electrode, a negative electrode, a separator, a first electrolyte and a second electrolyte. The separator is arranged at least between the positive electrode and the negative electrode. The first electrolyte is contained at least in the positive electrode. The first electrolyte includes a lithium salt and an aqueous solvent. The second electrolyte is contained at least in the negative electrode. The second electrolyte includes a bis(fluorosulfonyl)imide salt and an aqueous solvent.

15 Claims, 8 Drawing Sheets

(51) Int. Cl.
  *H01M 10/04* (2006.01)
  *H01M 4/485* (2010.01)
  *H01M 10/0568* (2010.01)
  *H01M 10/054* (2010.01)
  *H01M 6/04* (2006.01)

(56) References Cited

U.S. PATENT DOCUMENTS

| | | | |
|---|---|---|---|
| 2010/0136427 | A1 | 6/2010 | Kondo et al. |
| 2014/0287285 | A1* | 9/2014 | Inagaki ............... H01M 4/485 429/90 |
| 2015/0318530 | A1 | 11/2015 | Yushin et al. |
| 2015/0372350 | A1 | 12/2015 | Solomon et al. |
| 2016/0164096 | A1 | 6/2016 | Yokotsuji et al. |
| 2016/0172716 | A1 | 6/2016 | Baylard et al. |
| 2016/0351968 | A1 | 12/2016 | Wang et al. |
| 2018/0254524 | A1* | 9/2018 | Zhang ............... H01M 10/0569 |
| 2018/0277903 | A1* | 9/2018 | Xu ................... H01M 4/505 |

FOREIGN PATENT DOCUMENTS

| | | |
|---|---|---|
| JP | 2003-017057 A | 1/2003 |
| JP | 2005-071807 A | 3/2005 |
| JP | 5886606 B2 | 2/2016 |
| JP | 2016-110900 | 6/2016 |
| JP | 2016-186895 A | 10/2016 |
| JP | 2017-212153 A | 11/2017 |
| WO | WO 2015/107423 A2 | 7/2015 |
| WO | 2016/114141 A1 | 7/2016 |
| WO | WO 2017/135323 A1 | 8/2017 |

OTHER PUBLICATIONS

M-S. Wu, et al., "Electrochemical fabrication of anatase $TiO_2$ nanostructure as an anode material for aqueous lithium-ion batteries", Journal of Power Sources, vol. 185, pp. 1420-1424, 2008.

* cited by examiner

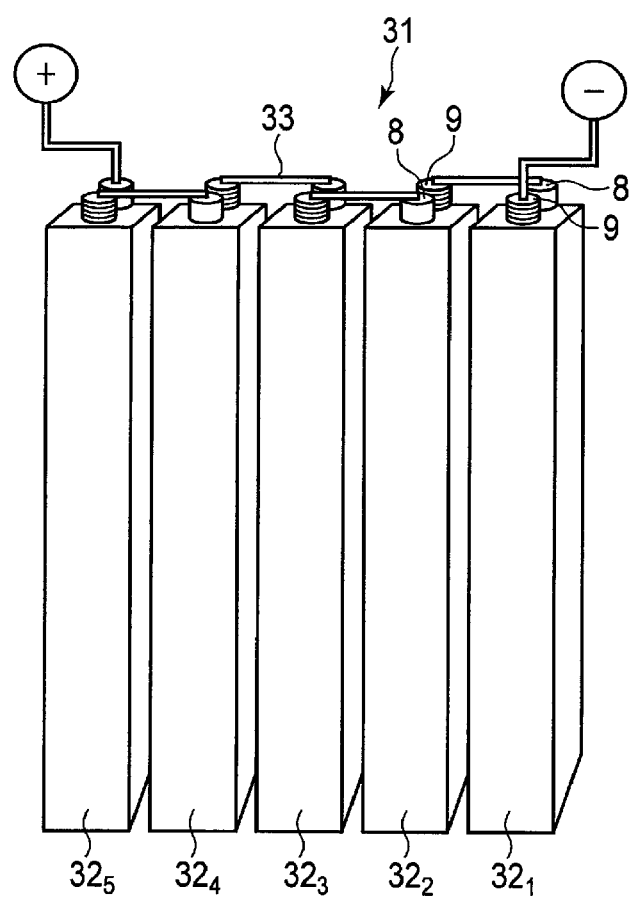
F I G. 5

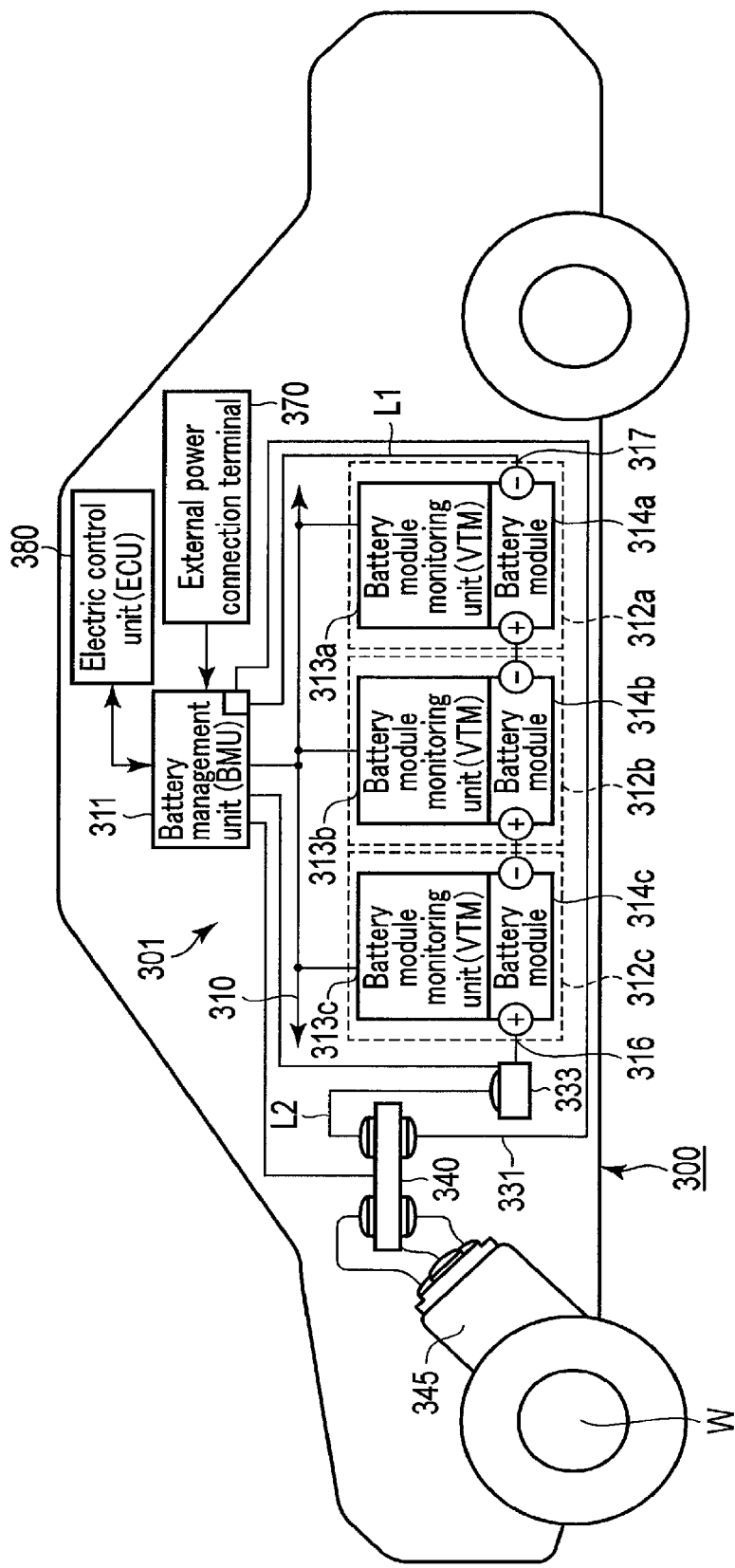
F I G. 10

SECONDARY BATTERY, BATTERY PACK, AND VEHICLE

CROSS-REFERENCE TO RELATED APPLICATIONS

This application is based upon and claims the benefit of priority from Japanese Patent Application No. 2017-054571, filed Mar. 21, 2017, the entire contents of which are incorporated herein by reference.

FIELD

Embodiments of the present invention relate to a secondary battery, battery pack and a vehicle.

BACKGROUND

A nonaqueous electrolyte battery using metallic lithium, a lithium alloy, a lithium compound, or a carbonaceous material in a negative electrode is expected as a high-energy density battery, and much research and development has been conducted. Lithium ion batteries each including a positive electrode containing $LiCoO_2$ or $LiMn_2O_4$ as an active material and a negative electrode containing a carbonaceous material that allows lithium ions to be inserted/extracted have widely been put into practical use for portable devices so far.

On the other hand, when installing the battery in a vehicle such as an automobile or an electric train, materials with excellent chemical and electrochemical stability, strength, and corrosion resistance are needed as the materials of the positive and negative electrodes from the viewpoint of storage performance, cycle performance, high-output performance, and long-term reliability under a high-temperature environment (60° C. or more). If high performance is required in a cold district, high-output performance and long-life performance under a low-temperature environment (−40° C.) are needed. On the other hand, from the viewpoint of improving safety performance, nonvolatile incombustible nonaqueous electrolytic solutions have been developed. However, the solutions have not yet been put into practical use because they lower the output characteristic, low-temperature performance, and long-life performance.

As described above, when installing a lithium ion battery in a vehicle such as a car, there are problems of heat endurance and low-temperature output performance. It is therefore difficult to install and use a lithium ion battery in the engine room or an automobile in place of a lead storage battery.

The electrolytic solution of the lithium ion battery is used under a high voltage of 2 V to 4.5 V. For this reason, use of an aqueous electrolytic solution is difficult. A nonaqueous electrolytic solution formed by dissolving a lithium salt in an organic solvent is used as the electrolytic solution of the lithium ion battery. Conventionally, improving large-current discharge performance and cycle life performance by improving the nonaqueous electrolytic solution composition has been examined. A nonaqueous electrolytic solution can hardly reduce the resistance of a battery because the ionic conductivity is lower than that of an aqueous electrolytic solution. In addition, an organic solvent that is the solvent of the nonaqueous electrolytic solution lowers the high-temperature cycle life performance of a battery because it is readily decomposed at a high temperature, and the thermal stability is poor. For these reasons, use of a solid electrolyte as a nonaqueous electrolyte has been examined. However, since the ionic conductivity of the solid electrolyte is lower than that of the nonaqueous electrolyte, a battery having excellent large-current discharge performance cannot be obtained.

BRIEF DESCRIPTION OF DRAWINGS

FIG. 5 is a perspective view showing an example of a battery module according to the embodiment;

FIG. 10 is a schematic view showing another example of the vehicle including the secondary battery according to the embodiment.

DETAILED DESCRIPTION

Figure 1:
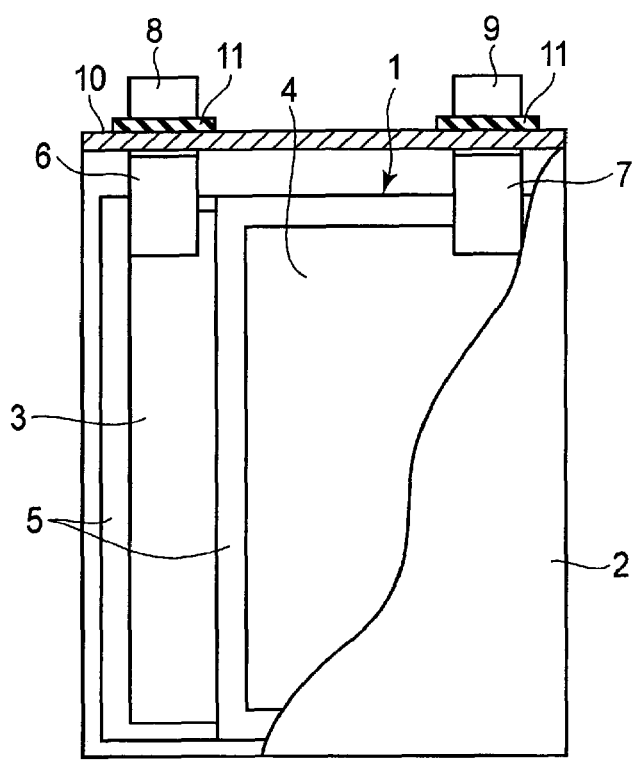
FIG. 1 is a partial cutaway sectional view of a secondary battery according to an embodiment.

According to one embodiment, there is provided a secondary battery including a positive electrode, a negative electrode, a separator, a first electrolyte, and a second electrolyte. The separator is arranged at least between the positive electrode and the negative electrode. The first electrolyte is contained at least in the positive electrode and contains a lithium salt and an aqueous solvent. The second electrolyte is contained at least in the negative electrode and contains a bis(fluorosulfonyl)imide salt and an aqueous solvent.

According to another embodiment, there is provided a battery pack including the secondary battery according to the embodiment.

According to still another embodiment, there is provided a vehicle including the battery pack according to the embodiment.

First Embodiment

According to the first embodiment, there is provided a secondary battery including a positive electrode, a negative electrode, a separator, a first electrolyte, and a second electrolyte. The separator is arranged at least between the positive electrode and the negative electrode. The first electrolyte exists at least in the positive electrode. The first electrolyte contains a lithium salt and an aqueous solvent. The second electrolyte exists at least in the negative electrode. The second electrolyte contains a bis(fluorosulfonyl)imide salt and an aqueous solvent.

Since the bis(fluorosulfonyl)imide salt, particularly, lithium bis(fluorosulfonyl)imide has excellent solubility in an aqueous solvent and is dissolved in an aqueous solvent at a high concentration (for example, 8 mol/L or more), the ionic conductivity of the second electrolyte can be raised. As a result, since the resistance in the negative electrode is reduced, the large-current performance of the secondary battery is improved. In addition to the improvement of the large-current performance, low-temperature performance can also be expected to be improved. Since the concentration of the bis(fluorosulfonyl)imide salt can be increased, free water molecules in the second electrolyte can be decreased, and hydrogen generation in the negative electrode can be reduced. As a result, since the negative electrode can allow ions (for example, lithium ions) to be efficiently inserted/extracted, the cycle life performance and storage performance of the secondary battery can be improved. Hydrogen generation does not occur in the positive electrode. If the first electrolyte exists at least in the positive electrode, the practicality can be ensured while suppressing the manufacturing cost. It is therefore possible to provide a practical secondary battery having excellent large-current performance, cycle life performance, and storage performance.

If lithium bis(fluorosulfonyl)imide ($Li[(FSO_2)_2N]$) and a bis(fluorosulfonyl)imide metal salt represented by $M[(FSO_2)_2N]_n$ (M is at least one element selected from the group consisting of Na, K, Mg, Zn, and Al, and n is 1, 2, or 3) are contained as the bis(fluorosulfonyl)imide salt, the large-current performance of the secondary battery is further improved. $M[(FSO_2)_2N]_n$ and $Li[(FSO_2)_2N]$ can be dissolved in an aqueous solvent at a high concentration (for example, 8 mol/L or more). The freezing point of $M[(FSO_2)_2N]_n$ is lower than that of $Li[(FSO_2)_2N]$. Hence, the second electrolyte containing the mixture of these salts can improve the ionic conductivity at a low temperature. It is therefore possible to improve the low-temperature performance of the secondary battery and also improve the large-current performance under an environment at the room temperature or more.

If the lithium salt is at least one salt selected from the group consisting of LiCl, LiOH, $LiNO_3$, $Li[(FSO_2)_2N]$, and $Li_2SO_4$, and the first electrolyte is an aqueous solution containing the lithium salt at a concentration of 1 mol/L or more, the resistance of the first electrolyte can be lowered, and the oxidation reaction in the positive electrode can be suppressed. As a result, since oxygen generation can be suppressed, and the current efficiency can be improved, the large-current performance of the secondary battery can be improved.

If the second electrolyte has a gel or solid form, diffusion of water molecules from the second electrolyte to the negative electrode can be suppressed. It is therefore possible to greatly suppress hydrogen generation in the negative electrode and greatly improve the cycle life performance and storage performance of the secondary battery.

The second electrolyte preferably satisfies $$1 \leq (M_1/M_2) \leq 5 \quad (1)$$

where $M_1$ is the number of mole of water in the second electrolyte, and $M_2$ is the number of mole of cation of the bis(fluorosulfonyl)imide salt in the second electrolyte.

If inequality (1) is satisfied, hydrogen generation caused by reductive decomposition of water can greatly be suppressed. Hence, the cycle life and storage performance of the secondary battery can be improved. Probably, free water molecules decrease due to the high concentration of lithium ions, and hydrogen generation can be suppressed.

When the negative electrode contains an active material containing a titanium-containing oxide, hydrogen generation caused by reductive decomposition of water in the negative electrode can greatly be suppressed. Hence, the cycle life and storage performance of the secondary battery can greatly be improved.

The first electrolyte, the second electrolyte, the negative electrode, the positive electrode, and the separator will be described below. Note that the secondary battery according to this embodiment may include a container member, and the container member will also be explained.

1) First Electrolyte (Electrolyte A)

The first electrolyte is held at least in the positive electrode. The first electrolyte contains a lithium salt and an aqueous solvent. The first electrolyte is an aqueous electrolyte.

Examples of the lithium salt include LiCl, LiBr, LiOH, $Li_2SO_4$, $LiNO_3$, $Li_2C_2O_4$, $Li[(FSO_2)_2N]$, $Li[(CF_3SO_2)_2N]$, and $LiB[(OCO)_2]_2$. One type of these lithium salts can be used, or two or more types may be used. In particular, the first electrolyte preferably contains at least one of LiCl, LiOH, $LiNO_3$, $Li[(FSO_2)_2N]$ and $Li_2SO_4$. This can increase the concentration of the lithium ions to 1 mol/L or more. As a result, the ionic conductivity of the first electrolyte can be improved, and free water molecules can be decreased to suppress hydrogen generation. A more preferable concentration is 1.5 to 3 mol/L. Since the ionic conductivity of the first electrolyte is high in this range regarding the concentration, the reaction resistance in the positive electrode lowers, and the large-current performance of the secondary battery improves.

The aqueous solvent is a solvent containing water and can be formed from water alone or water and a solvent other than water. As the solvent other than water, a water-soluble organic solvent can be used. As the water-soluble organic solvent, γ-butyrolactone, acetonitrile, alcohols, N-methylpyrrolidone (NMP), dimethyl acetamide, dimethyl sulfoxide, tetrahydrofuran, or the like is usable. One type of these solvents can be contained in the aqueous solvent, or two or more types may be contained. The content of the solvent other than water in the aqueous solvent is preferably 20 wt % or less.

In the first electrolyte, the solvent amount (for example, the amount of water in the aqueous solvent) with respect to 1 mol of the salt serving as a solute is preferably 1 mol or more. As a more preferable form, the solvent amount with respect to 1 mol of the salt serving as a solute is 3.5 mol or more.

Whether the first electrolyte contains water can be confirmed by GC-MS (Gas Chromatography-Mass Spectrometry). The salt concentration and the water content in the first electrolyte can be measured by, for example, ICP (Inductively Coupled Plasma) emission spectrometry. The molar concentration (mol/L) can be calculated by measuring a predetermined amount of first electrolyte and calculating the concentration of contained salt. The numbers of mole of the solute and the solvent can be calculated by measuring the specific gravity of the first electrolyte.

The first electrolyte is prepared by dissolving, for example, a lithium salt in an aqueous solvent. The first electrolyte can be a solution or an aqueous solution. To set the pH of the first electrolyte in the alkaline region, the first electrolyte preferably contains LiOH. The pH can thus be adjusted. If the first electrolyte contains sulfuric acid, the pH can be set in the acid region. The pH value is preferably 2 to 14. Water generation can be reduced in this range. This improves the cycle life performance and storage performance of the secondary battery. The pH of the first electrolyte is more preferably 2 to 6.5 in the acid region or 7.5 to 12 in the alkaline region.

As an anionic species, the first electrolyte preferably contains at least one anionic species selected from the group consisting of an chlorine ion ($Cl^-$), hydroxyl ion ($OH^-$), bis(fluorosulfonyl)imide ion [(FSO$_2$)$_2$N]$^-$, sulfuric acid ions (SO$_4^{2-}$), and nitric acid ion (NO$_3^-$). One type of these anionic species can be used, or two or more types may be used.

The first electrolyte may be a gel electrolyte formed by compositing a lithium salt, an aqueous solvent, and a polymeric material. This can suppress diffusion of water molecules from the first electrolyte to the negative electrode. It is therefore possible to greatly suppress hydrogen generation in the negative electrode and greatly improve the cycle life performance and storage performance of the secondary battery.

As the polymeric material, for example, polyacrylate (for example, lithium polyacrylate or potassium polyacrylate), polyvinylidene fluoride (PVdF), polyacrylonitrile (PAN), polyethylene oxide (PEO), or cellulose nanofiber can be used. One type of these polymeric materials can be used, or two or more types may be used.

The content of the polymeric material in the first electrolyte can fall within the range of 0.5 wt % to 10 wt %.

The first electrolyte can contain both lithium ions and sodium ions.

2) Second Electrolyte (Electrolyte B)

The second electrolyte is held at least in the negative electrode. The second electrolyte contains a bis(fluorosulfonyl)imide salt and an aqueous solvent. The second electrolyte is an aqueous electrolyte.

The bis(fluorosulfonyl)imide salt is preferably lithium bis(fluorosulfonyl)imide (Li[(FSO$_2$)$_2$N]). This is because Li[(FSO$_2$)$_2$N] can be dissolved in an aqueous solvent at a high concentration, and therefore, the ionic conductivity of the second electrolyte can be improved.

As the bis(fluorosulfonyl)imide salt, Li[(FSO$_2$)$_2$N] may be used alone. However, a salt mixture of Li[(FSO$_2$)$_2$N] and a bis(fluorosulfonyl)imide metal salt represented by M[(FSO$_2$)$_2$N]$_n$ (M is at least one element selected from the group consisting of Na, K, Mg, Zn, and Al, and n is 1, 2, or 3) may be used. The salt mixture contributes to improvement of the large-current performance of the secondary battery. In M, more preferable elements are Zn and Mg. One type of these elements can be used, or two or more types may be used.

The second electrolyte preferably satisfies $$1 \le (M_1/M_2) \le 5 \quad (1)$$

where $M_1$ is the number of mole of water in the second electrolyte, and $M_2$ is the number of mole of cation of the bis(fluorosulfonyl)imide salt in the second electrolyte. If a plural of types of bis(fluorosulfonyl)imide salts exist, $M_2$ is the total amount of the number of mole of various types of cations.

If inequality (1) is satisfied, hydrogen generation caused by reductive decomposition of water can greatly be suppressed. Hence, the cycle life and storage performance of the secondary battery can be improved. Probably, free water molecules decrease due to the high concentration of lithium ions, and hydrogen generation can be suppressed. A more preferable range of inequality (1) is $2 \le (M_1/M_2) \le 5$.

If the second electrolyte has a gel or solid form, diffusion of water molecules from the second electrolyte to the negative electrode can be suppressed. It is therefore possible to greatly suppress hydrogen generation in the negative electrode and greatly improve the cycle life performance and storage performance of the secondary battery.

The gel electrolyte may be formed by compositing a bis(fluorosulfonyl)imide salt, an aqueous solvent, and a polymeric material. As the polymeric material, for example, polyacrylate (for example, lithium polyacrylate or potassium polyacrylate), polyvinylidene fluoride (PVdF), polyacrylonitrile (PAN), polyethylene oxide (PEO), or cellulose nanofiber can be used. One type of these polymeric materials can be used, or two or more types may be used.

The content of the polymeric material in the second electrolyte can fall within the range of 0.5 wt % to 10 wt %.

The second electrolyte has a low affinity for the first electrolyte. In other words, the second electrolyte is not compatible but incompatible with the first electrolyte and can exist separately from the first electrolyte. It is therefore possible to distribute most of the second electrolyte in the negative electrode while distributing most of the first electrolyte in the positive electrode. If the first electrolyte is a liquid, and the second electrolyte has a gel or solid form, the second electrolyte can more easily be separated from the first electrolyte. As a result, the large-current performance, cycle life performance, and storage performance of the secondary battery can further be improved. After the second electrolyte is held in the negative electrode and applied to a gelation in this state, the second electrolyte is preferably impregnated in the positive electrode or electrode group.

The aqueous solvent is a solvent containing water and can be formed from water alone or water and a solvent other than water. As the solvent other than water, a water-soluble organic solvent can be used. As the water-soluble organic solvent, γ-butyrolactone, acetonitrile, alcohols, N-methylpyrrolidone (NMP), dimethyl acetamide, dimethyl sulfoxide, tetrahydrofuran, or the like is usable. One type of these solvents can be contained in the aqueous solvent, or two or more types may be contained. The content of the solvent other than water in the aqueous solvent is preferably 20 wt % or less.

In the second electrolyte, the solvent amount (for example, the amount of water in the aqueous solvent) with respect to 1 mol of the salt serving as a solute is preferably 1 mol or more. As a more preferable form, the solvent amount with respect to 1 mol of the salt serving as a solute is 3.5 mol or more.

Whether the second electrolyte contains water can be confirmed by GC-MS (Gas Chromatography-Mass Spectrometry). The salt concentration and the water content in the second electrolyte can be measured by, for example, ICP (Inductively Coupled Plasma) emission spectrometry. The molar concentration (mol/L) can be calculated by measuring a predetermined amount of second electrolyte and calculating the concentration of contained salt. The numbers of mole of the solute and the solvent can be calculated by measuring the specific gravity of the second electrolyte.

The second electrolyte can contain both lithium ions and sodium ions.

3) Negative Electrode

The negative electrode includes a negative electrode current collector, and a negative electrode active material-containing layer carried on one or both surfaces of the negative electrode current collector and containing an active material and, as needed, an electroconductive agent and a binder.

As the negative electrode current collector, a foil, a porous body, or a mesh made of a metal such as zinc, nickel, stainless steel, iron, copper, aluminum, or titanium is preferably used. One type of material can be used as the material component of the negative electrode current collector, or two or more types may be used. The negative electrode current collector containing a metal selected from the above-described types preferably has at least a part of the surface coated with a metal oxide layer by an oxidation treatment.

In addition, a foil made of galvanized aluminum, iron, stainless steel, or nickel is preferable.

The thickness of the negative electrode current collector can fall within the range of 5 µm to 20 µm.

As the negative electrode active material, negative electrode active material particles capable of allowing lithium or lithium ions to be inserted/extracted can be used. The insertion/extraction potential of the lithium ions of the negative electrode active material preferably falls within the range of 0.2 to 3 V (vs. Li/Li$^+$) relative to the Li potential. Examples of the negative electrode active material include a lithium alloy, a carbon material, a lithium titanium oxide, a titanium oxide, a niobium titanium oxide (for example, $TiNb_2O_7$), and a lithium sodium niobium titanium oxide. One type of these negative electrode active materials can be used, or two or more types may be used.

The negative electrode active material preferably contains at least one titanium-containing oxide. One type of these titanium-containing oxides can be used, or two or more types may be used. When the titanium-containing oxide is used, an aluminum foil can be used as the negative electrode current collector in place of a copper foil. As a result, since aluminum can be used for both the negative electrode current collector and the positive electrode current collector, reduction of the weight and cost of the secondary battery can be implemented. Additionally, use of the titanium-containing oxide is advantageous in a bipolar electrode structure. The titanium-containing oxide can allow Na$^+$ ions to be inserted/extracted. Examples of the titanium-containing oxide include a lithium titanium oxide, a titanium oxide, a niobium titanium oxide, and a sodium niobium titanium oxide.

Examples of the lithium titanium oxide include a lithium titanium oxide having a spinel structure (for example, the general formula is $Li_{4+x}Ti_5O_{12}$ ($-1 \leq x \leq 3$)), a lithium titanium oxide having a ramsdellite structure (for example, $Li_{2+x}Ti_3O_7$ ($-1 \leq x \leq 3$)), $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), and $Li_xTiO_2$ ($0 < x \leq 1$).

Examples of the titanium oxide includes a titanium oxide having a monoclinic crystal structure, a titanium oxide having a rutile structure, and a titanium oxide having an anatase structure. For the titanium oxides of these crystal structures, the composition before charge can be expressed as $TiO_2$, and the composition after charge can be expressed as $Li_xTiO_2$ ($0 \leq x \leq 1$). In addition, the structure of a titanium oxide having a monoclinic structure before charge can be expressed as $TiO_2(B)$.

Examples of the niobium titanium oxide include a material expressed as $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, M is at least one element selected from the group consisting of Fe, V, Mo, and Ta).

Examples of the sodium niobium titanium oxide include an orthorhombic Na-containing niobium titanium composite oxide represented by the general formula $Li_{2+v}Na_{2-w}M1_xTi_{6-y-z}Nb_yM2_zO_{14+\delta}$ ($0 \leq v \leq 4$, $0 < w < 2$, $0 \leq x < 2$, $0 < y \leq 6$, $0 \leq z \leq 3$, $-0.5 \leq \delta \leq 0.5$, $0 < (6-y-z) < 6$, M1 includes at least one element selected from the group consisting of Cs, K, Sr, Ba, and Ca, and M2 includes at least one element selected from the group consisting of Zr, Sn, V, Ta, Mo, W, Fe, Co, Mn, and Al).

Preferable titanium-containing oxides include a lithium titanium oxide having a spinel structure. The lithium titanium oxide having a spinel structure can reduce a volume change caused by a charge-and-discharge reaction.

The negative electrode active material is contained in the negative electrode active material-containing layer in a form of particles. The negative electrode active material particles can be single primary particles, secondary particles as the aggregates of primary particles, or a mixture of single primary particles and secondary particles. The shape of a particle is not particularly limited and can be, for example, spherical, elliptical, flat, or fibrous.

The average particle size (average particle diameter) of the secondary particles of the negative electrode active material is preferably 5 µm or more. The average particle size is more preferably 7 µm to 20 µm. The effect of suppressing hydrogen generation can be enhanced in this range.

The negative electrode active material whose secondary particles have an average particle size of 5 µm or more can be obtained, for example, by the following method. The raw materials of the active material are reactively synthesized to produce an active material precursor having an average particle size of 1 µm or less. After that, a calcination treatment is performed, and a grinding treatment is performed using a grinder such as a ball mill or a jet mill. Next, in a calcination treatment, the active material precursor is aggregated to grow secondary particles with a larger particle size.

The average particle size of the primary particles of the negative electrode active material is preferably 1 µm or less. This shortens the diffusion distance of ions in the active material and increases the specific surface area. For this reason, excellent high input performance (rapid charge) can be obtained. The lower limit of the average particle size can be set to 0.001 µm. A more preferable average particle size is 0.1 µm to 0.8 µm.

The negative electrode active material particles preferably have an average primary particle size of 1 µm or less, and the specific surface area in the BET method by $N_2$ adsorption preferably falls within the range of 3 m$^2$/g to 200 m$^2$/g. The reason why the specific surface area is defined in this range will be described. Setting the specific surface area to 3 m$^2$/g or more is preferable to suppress hydrogen generation from the negative electrode. Since this also contributes to suppression of the interface resistance of the negative electrode, the output characteristic and charge-and-discharge cycle characteristic can be improved. In addition, when the specific surface area is set to 200 m$^2$/g or less, the amount of the binder contained in the negative electrode active material-containing layer can be reduced, and a high electrode density can be obtained. It is therefore possible to improve the capacity and suppress an increase in the resistance. The specific surface area more preferably ranges from 15 m$^2$/g to 150 m$^2$/g.

At least a part of the surface of the negative electrode active material particle such as a titanium-containing oxide particle is preferably coated with a coating including at least one element (to be referred to as a first element hereinafter) selected from the group consisting of B, P, Al, La, Zr, Ge, Ti, Zn, Sn, Ga, Pb, In, Bi, and Tl. Alternatively, the negative electrode active material particles are preferably mixed with first element-containing particles, or both coating and mixing are preferably done. This makes it possible to smoothly advance ion inserted/extracted and improve the large-current discharge performance of the battery while greatly suppressing hydrogen generation. Elements such as Ga, In, Bi, Tl, Sn, Pb, Al, Zn, and Ti have an excellent function of raising a hydrogen generation overvoltage. The particles can be primary particles, secondary particles, or a mixture of primary particles and secondary particles. Each element can have any form of a simple substance, a compound, and an alloy. Each element can exist in the negative electrode in a plural of forms such as a simple substance and a compound.

When the first element-containing particles are mixed with the negative electrode active material particles, the mixing ratio preferably satisfies $$2 \text{ wt \%} \leq \{W_1/W_2\} \times 100 \leq 50 \text{ wt \%} \quad (1)$$

where $W_1$ is the weight of the first element-containing particles, and $W_2$ is the weight of the negative electrode active material particles. If the surfaces of titanium-containing oxide particles are coated with a coating, $W_2$ is the total weight of the titanium-containing oxide particles and the coating.

When the weight ratio of the first element is set to 2 wt % to 50 wt %, the electron conductivity in the negative electrode is improved, and hydrogen generation is greatly suppressed. This makes it possible to smoothly advance inserted/extracted of lithium ions and improve the large-current discharge performance of the battery. The weight ratio more preferably ranges from 3 wt % to 30 wt %.

The weight ratio of the first element is measured by the following method. The secondary battery is disassembled in a glove box filled with argon to extract the negative electrode. The negative electrode active material-containing layer is separated from the negative electrode current collector of the extracted negative electrode. The negative electrode active material-containing layer is washed by water or a neutral aqueous solution and dried. After that, the first element and the negative electrode active material are separated using the specific gravity difference between the first element and the negative electrode active material. The separation is done by a method of putting the powder mixture in an organic solvent and separating the first element and the negative electrode active material using the difference in the sedimentation velocity or a method of separating the first element and the negative electrode active material using a dry gravity concentrator. The weights of the first element and the negative electrode active material are measured, and the weight ratio is calculated based on inequality (1).

Examples of the compound of the first element include an oxide of the first element and a hydroxide of the first element. As the oxide of the first element, a solid electrolyte having no electron conductivity but ionic conductivity, a zinc oxide (for example, $ZnO$ or $ZnO_2$), alumina (for example, $Al_2O_3$), zirconia (for example, $ZrO_2$), a boron oxide (for example, $B_2O_3$), or a titanium oxide (for example, $TiO$ or $TiO_2$) can be used. The zinc oxide can suppress hydrogen generation and improve the cycle life performance and storage performance. A coating containing the zinc oxide is preferable.

Examples of the alloy of the first element include a Zn-containing alloy, Bi—In—Pb-based alloy, Bi—In—Ca-based alloy, and Bi—In—Al-based alloy. According to these alloys, the hydrogen generation overvoltage can be raised.

The coating preferably contains a Zn component. Since the coating containing the Zn component has a large hydrogen overvoltage and functions as the negative electrode active material, hydrogen generation is suppressed, and a high-capacity negative electrode can be implemented. Because of excellent electron conductivity, metallic zinc can serve as an electroconductive agent and increase the electron conductivity of the negative electrode. Examples of the Zn component include metallic zinc (simple zinc), a zinc compound, and a zinc-containing alloy. As the zinc compound, a zinc oxide (for example, $ZnO$ or $ZnO_2$), zinc hydrate ions, zinc hydroxide ($Zn(OH)_2$), or zinc oxide ions ($ZnO_2^{2-}$) can be used. If the coating contains metallic zinc, the metallic zinc can change to a zinc oxide (for example, $ZnO$ or $ZnO_2$) by a charge-and-discharge reaction.

The coating can have a layered, granular, film-shaped, membranous, or fibrous form.

The thickness of the coating is preferably 0.05 µm to 0.5 µm. When the thickness is set to 0.05 µm or more, it is possible to suppress hydrogen generation and improve the life performance. When the thickness is set to 0.5 µm or less, it is possible to lower the negative electrode resistance and improve the large-current discharge performance. The thickness of the coating preferably ranges from 0.06 µm to 0.3 µm. The thickness of the coating can be measured by observation using a scanning electron microscope (SEM) or a transmission electron microscope (TEM).

As the method of coating at least a part of the surface of a titanium-containing oxide particle, a method of adding a simple substance, alloy, or compound of the first element to the negative electrode or dissolving a salt of the first element in the first or second electrolyte can be used. As another coating method, plating or deposition can be used.

The porosity of the negative electrode (except the current collector) preferably ranges from 20% to 50%. A negative electrode having a high affinity for the first and second electrolytes and also having a high density can thus be obtained. The porosity more preferably ranges from 25% to 40%.

The density of the negative electrode can fall within the range of 2 g/cm$^3$ to 3 g/cm$^3$.

As the electroconductive agent, a carbon material such as acetylene black, carbon black, coke, carbon fiber, or graphite or a metal powder such as nickel or zinc can be used. One type of these electroconductive agents can be used, or two or more types may be used. Since a carbon material may generate hydrogen from itself, a metal powder is preferably used as the electroconductive agent. If zinc particles are used as the first element, no electroconductive agent is needed because the zinc particles serve as the electroconductive agent. In addition, the zinc particles function as the negative electrode active material. Hence, when the zinc particles are used as the first element, hydrogen generation is suppressed, a negative electrode capable of suppressing hydrogen generation and having excellent electron conductivity and a high capacity can be implemented.

As the binder, for example, polytetrafluoroethylene (PTFE), fluorine-based rubber, styrene butadiene rubber, or a core shell binder can be used. One type of these binders can be used, or two or more types may be used.

As the mixing ratio of the negative electrode active material, the electroconductive agent, and the binder, the content of the negative electrode active material preferably falls within the range of 80 wt % to 95 wt %, the content of the electroconductive agent preferably falls within the range of 3 wt % to 18 wt %, and the content of the binder preferably falls within the range of 2 wt % to 7 wt %.

The negative electrode is produced by, for example, suspending the negative electrode active material, the electroconductive agent, and the binder in an appropriate solvent, applying the suspended substance to the current collector, drying the suspended substance, and performing press such as hot press.

4) Positive Electrode

The positive electrode includes a positive electrode current collector, and a positive electrode active material-containing layer supported on one or both surfaces of the positive electrode current collector and containing an active material and, as needed, an electroconductive agent and a binder.

As the positive electrode current collector, a foil, a porous body, or a mesh made of a metal such as nickel, stainless steel, iron, or copper is preferably used.

As the positive electrode active material, a lithium manganese composite oxide, a lithium nickel composite oxide, a lithium cobalt aluminum composite oxide, a lithium nickel cobalt manganese composite oxide, a lithium manganese nickel composite oxide having a spinel structure, a lithium manganese cobalt composite oxide, a lithium phosphate having an olivine structure (for example, $LiFePO_4$), or a lithium manganese phosphate having an olivine structure (for example, $LiMnPO_4$) can be used.

Examples of a positive electrode active material capable of obtaining a high voltage are a lithium manganese composite oxide such as $Li_xMn_2O_4$ ($0<x\leq1$) or $Li_xMnO_2$ ($0<x\leq1$), a lithium nickel aluminum composite oxide such as $Li_xNi_{1-y}Al_yO2$ ($0<x\leq1$, $0<y\leq1$), a lithium cobalt composite oxide such as $Li_xCoO_2$ ($0<x\leq1$), a lithium nickel cobalt composite oxide such as $Li_xNi_{1-y-z}Co_yMn_zO_2$ ($0<x\leq1$, $0<y\leq1$, $0\leq z\leq1$, $0<1-y-z<1$), a lithium manganese cobalt composite oxide such as $Li_xMn_yCo_{1-y}O_2$ ($0<x\leq1$, $0<y\leq1$), a lithium manganese nickel composite oxide having a spinel structure such as $Li_xMn_{2-y}Ni_yO_4$ ($0<x\leq1$, $0<y<2$), a lithium phosphorus oxide having an olivine structure such as $Li_xFePO_4$ ($0<x\leq1$), $Li_xFe_{1-y}Mn_yPO_4$ ($0<x\leq1$, $0\leq y\leq1$), or $Li_xCoPO_4$ ($0<x\leq1$), and a fluorinated iron sulfate (for example, $Li_xFeSO_4F$ ($0<x\leq1$)).

According to the lithium nickel aluminum composite oxide, the lithium nickel cobalt manganese composite oxide, and the lithium manganese cobalt composite oxide, it is possible to suppress a reaction with a nonaqueous electrolyte under a high-temperature environment and greatly improve the battery life. A composite oxide that can be represented by $Li_xNi_{1-y-z}Co_yMn_zO_2$ ($0\leq x\leq1.1$, $0\leq y\leq0.5$, $0\leq z\leq0.5$, more preferably, $0<x\leq1.1$, $0<y\leq0.5$, $0<z\leq0.5$) is advantageous for a heat endurance life.

The lithium phosphorus oxide having an olivine structure and the lithium manganese composite oxide having a spinel structure (for example, $Li_xMn_2O_4$ ($0<x\leq1$)) are preferable positive electrode active materials because they have high stability to an aqueous solvent.

The particles of the positive electrode active material can include single primary particles, secondary particles as the aggregates of primary particles, or both single primary particles and secondary particles.

The average particle size (average particle diameter) of the primary particles of the positive electrode active material is preferably 1 μm or less, more preferably, 0.05 μm to 0.5 μm. At least a part of the particle surface of the positive electrode active material is preferably coated with a carbon material. The carbon material can have a layered structure, a granular structure, or a particle aggregate form.

The average secondary particle size of the positive electrode active material can fall within the range of, for example, 3 μm to 20 μm.

As the electroconductive agent used to improve the electron conductivity and suppress the contact resistance to the current collector, for example, acetylene black, carbon black, or graphite can be used. One type of these electroconductive agents can be used, or two or more types may be used.

As the binder used to bind the active material and the electroconductive agent, for example, polytetrafluoroethylene (PTFE) or fluorine-based rubber can be used. One type of these binders can be used, or two or more types may be used.

As the mixing ratio of the positive electrode active material, the electroconductive agent, and the binder, the content of the positive electrode active material preferably falls within the range of 80 wt % to 95 wt %, the content of the electroconductive agent preferably falls within the range of 3 wt % to 18 wt %, and the content of the binder preferably falls within the range of 2 wt % to 7 wt %. The electroconductive agent can exhibit the above-described effect at 3 wt % or more, and can reduce decomposition of the nonaqueous electrolyte on the electroconductive agent surface under a high temperature at 18 wt % or less. The binder can obtain a sufficient electrode strength at 2 wt % or more, and can reduce the insulating portion of the electrode at 7 wt % or less.

The density of the positive electrode can fall within the range of 2.5 g/cm³ to 3.5 g/cm³.

The positive electrode is produced by, for example, suspending the positive electrode active material, the electroconductive agent, and the binder in an appropriate solvent, applying the suspended substance to the positive electrode current collector current collector, drying the suspended substance, and performing press. The positive electrode press pressure preferably falls within the range of 0.15 ton/mm to 0.3 ton/mm. This range is preferable because the adhesion (peel strength) between the positive electrode active material-containing layer and the positive electrode current collector (for example, an aluminum foil or an aluminum alloy foil) increases, and the elongation percentage of the positive electrode current collector becomes 20% or less.

5) Separator

The separator includes a portion arranged between the positive electrode and the negative electrode. A part of the separator may include a portion facing only the positive electrode or the negative electrode. Examples of the separator include nonwoven fabric, a film, and paper. Examples of the material of the separator include a polyolefin such as polyethylene or polypropylene, and a cellulose. Preferable examples of the separator include nonwoven fabric containing cellulose fiber and a porous film containing polyolefin fiber. The porosity of the separator is preferably 60% or more. The fiber diameter is preferably 10 μm or less. When the fiber diameter is 10 μm or less, the affinity of the separator for an electrolyte can be improved to lower the battery resistance. The fiber diameter preferably falls within the range of 3 μm or less. Cellulose fiber-containing nonwoven fabric having a porosity of 60% or more has a high impregnating ability for an electrolyte and can exhibit a high output characteristic from a low temperature to a high temperature. In addition, since the cellulose fiber-containing nonwoven fabric does not react with the negative electrode even in long-term storage of the charged battery, floatcharge, or over-charge, a short circuit between the negative electrode and the positive electrode caused by dendrite precipitation of metallic lithium does not occur. The porosity is more preferably 62% to 80%.

The separator preferably has a thickness of 20 μm to 100 μm and a density of 0.2 g/cm³ to 0.9 g/cm³. In these ranges, it is possible to provide a secondary battery capable of balancing the mechanical strength and the reduction of the battery resistance, having a high output, and suppressing an internal short circuit. In addition, heat shrinkage occurs little under a high-temperature environment, and satisfactory high-temperature storage performance can be attained.

As the separator, a solid electrolyte can also be used. The solid electrolyte is preferably an oxide such as LATP ($Li_{1+x}Al_xTi_{2-x}(PO_4)_3$, $0.1\leq x\leq0.4$) having a NASICON structure, LIPON ($Li_{2.9}PO_{3.3}N_{0.46}$) in an amorphous state, or garnet-type LLZ ($Li_7La_3Zr_2O_{12}$).

6) Container

As the container that stores the positive electrode, the negative electrode, and the nonaqueous electrolyte, a metal container, a laminated film container, or a resin container made of polyethylene or polypropylene can be used.

As the metal container, a metal can made of nickel, iron, or stainless steel and having a rectangular or cylindrical shape can be used.

Each of the resin container and the metal container preferably has a board thickness of 1 mm or less, more preferably, 0.5 mm or less. A more preferable range is 0.3 mm or less. The lower limit of the board thickness is preferably 0.05 mm.

As the laminated film, for example, a multilayer film including a resin film and a metal layer coated with the resin film can be used. Examples of the metal layer include a stainless steel foil, an aluminum foil, and an aluminum alloy foil. For the resin film, a polymeric material such as polypropylene (PP), polyethylene (PE), nylon, or polyethylene terephthalate (PET) can be used. The thickness of the laminated film preferably falls within the range of 0.5 mm or less. A more preferable range is 0.2 mm or less. The lower limit of the thickness of the laminated film is preferably 0.01 mm.

The secondary battery according to this embodiment can be applied to secondary batteries in various forms such as a rectangular type, a cylindrical type, a flat type, a thin type, and a coin type. The secondary battery preferably has a bipolar structure. Consequently, one secondary battery having the bipolar structure can be used for a high voltage battery instead of a plural of series batteries.

An example of the secondary battery according to the embodiment will be described with reference to FIGS. 1, 2, 3, and 4.

Figure 2:
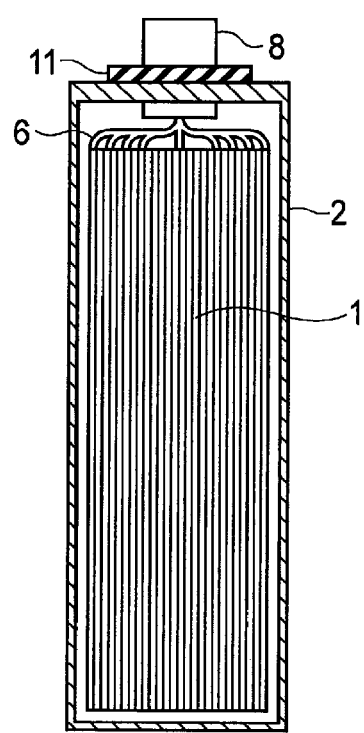
FIG. 2 is a side view of the battery shown in FIG. 1.

FIGS. 1 and 2 show an example of the secondary battery using a metal container.

An electrode group 1 is stored in a rectangular tubular metal container 2. The electrode group 1 has a structure formed by spirally winding a positive electrode 3 and a negative electrode 4 with a separator 5 interposing therebetween so as to form a flat shape. The first electrolyte (not shown) is held by the positive electrode 3 in the electrode group 1. On the other hand, the second electrolyte (not shown) is held by the negative electrode 4 in the electrode group 1. As shown in FIG. 2, a strip-shaped positive electrode lead 6 is electrically connected to each of a plural of portions at an end of the positive electrode 3 located on an end face of the electrode group 1. A strip-shaped negative electrode lead 7 is electrically connected to each of a plural of portions at an end of the negative electrode 4 located on the end face. The plural of positive electrode leads 6 are bundled, and in this state, electrically connected to a positive electrode tab 8. A positive electrode terminal is formed from the positive electrode leads 6 and the positive electrode tab 8. In addition, the negative electrode leads 7 are bundled, and in this state, connected to a negative electrode tab 9. A negative electrode terminal is formed from the negative electrode leads 7 and the negative electrode tab 9. A sealing plate 10 made of a metal is fixed to the opening portion of the metal container 2 by welding or the like. The positive electrode tab 8 and the negative electrode tab 9 are extracted to the outside from outlet holes formed in the sealing plate 10, respectively. The inner surface of each outlet hole of the sealing plate 10 is coated with an insulating member 11 to avoid a short circuit caused by contact between the positive electrode tab 8 and the sealing plate 10, or by contact between the negative electrode tab 9 and the sealing plate 10.

Figure 3:
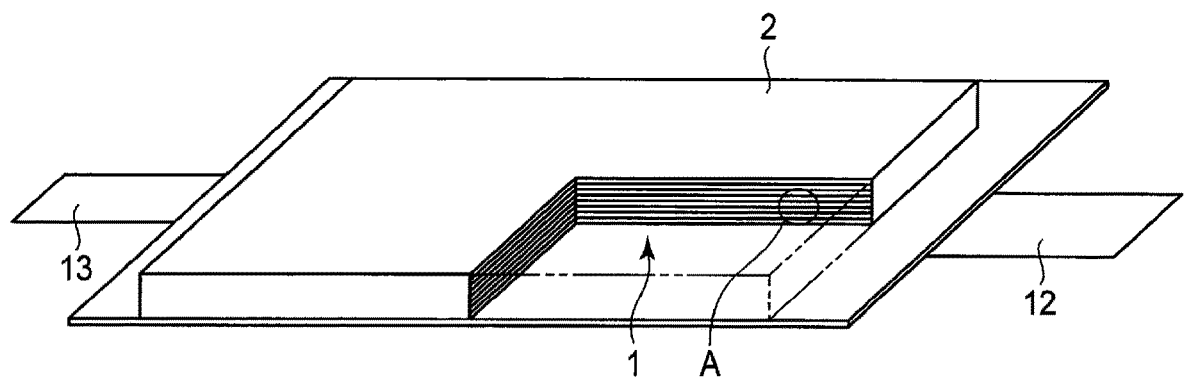
FIG. 3 is a partial cutaway perspective view showing the secondary battery according to the embodiment.
Figure 4:
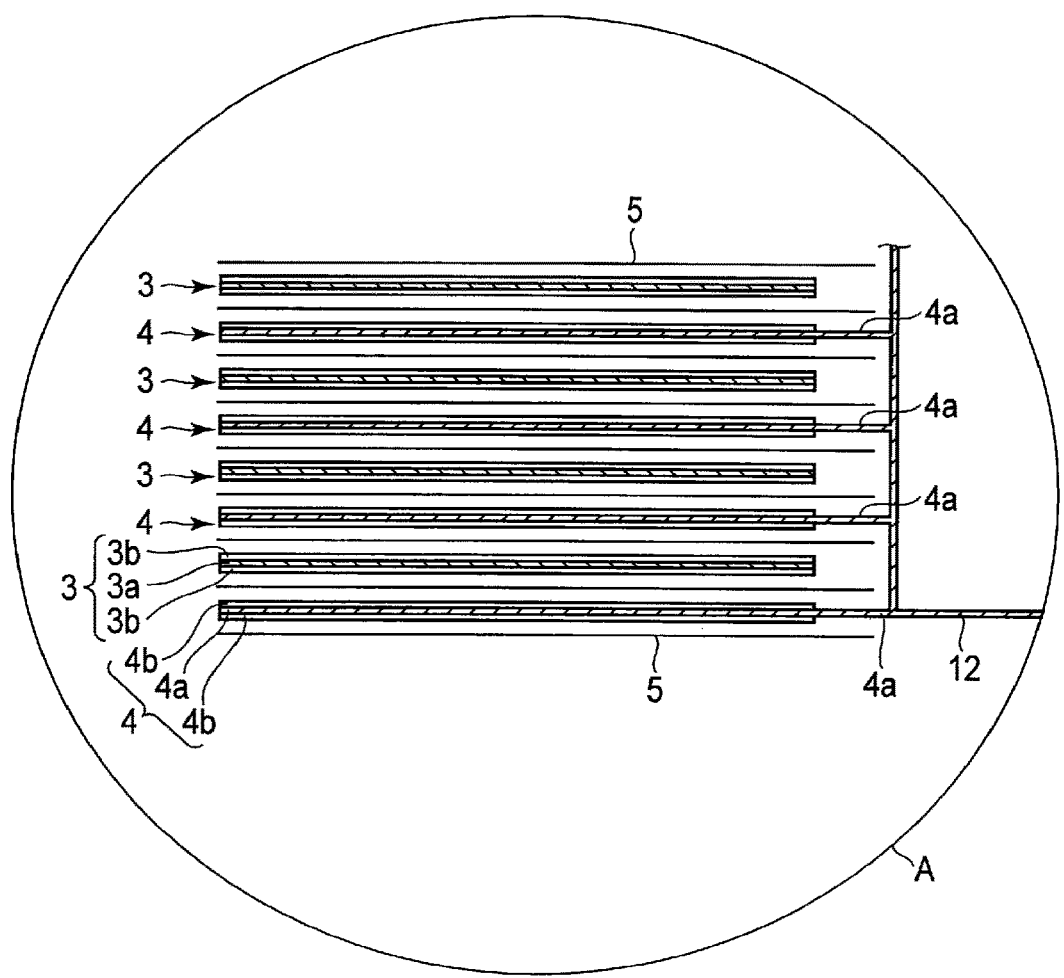
FIG. 4 is an enlarged sectional view of a portion A in FIG. 3.

FIGS. 3 and 4 show an example of a secondary battery including a container member made of a laminated film.

The stacked electrode group 1 is stored in the sack-shaped container 2 made of a laminated film including a metal layer interposing between two resin films. The first electrolyte (not shown) is held by the positive electrode 3 in the electrode group 1. On the other hand, the second electrolyte (not shown) is held by the negative electrode 4 in the electrode group 1. As shown in FIG. 4, the stacked electrode group 1 has a structure formed by alternately stacking the positive electrodes 3 and the negative electrodes 4 with the separators 5 interposing therebetween. A plural of positive electrodes 3 exist, each of which includes a current collector 3a and positive electrode active material-containing layers 3b formed on both surfaces of the current collector 3a. A plural of negative electrodes 4 exist, each of which includes a current collector 4a and negative electrode active material-containing layers 4b formed on both surfaces of the current collector 4a. The current collector 4a of each negative electrode 4 has one side projecting from the positive electrodes 3. Each projecting current collector 4a is electrically connected to a strip-shaped negative electrode terminal 12. The distal end of a strip-shaped negative electrode terminal 12 is extracted from the container 2 to the outside. Although not illustrated, in the current collector 3a of each positive electrode 3, a side located on a side opposite to the projecting sides of the current collectors 4a projects from the negative electrodes 4. Each current collector 3a projecting from the negative electrodes 4 is electrically connected to a strip-shaped positive electrode terminal 13. The distal end of the strip-shaped positive electrode terminal 13 is located on the side opposite to the negative electrode terminal 12 and extracted from the side of the container 2 to the outside. The separators 5 are located on both outermost layers of the electrode group 1. The separator 5 on one outermost layer faces the positive electrode 3, and the separator 5 on the other outermost layer faces the negative electrode 4.

The secondary battery shown in FIGS. 1, 2, 3, and 4 can be provided with a rupture member to discharge hydrogen gas generated in the container to the outside. As the rupture member, either a reset type that operates when the internal pressure exceeds a set value and functions as a sealing plug when the internal pressure lowers, or a non-reset type that cannot recover the function as a sealing plug once it operates can be used. The secondary battery shown in FIGS. 1, 2, 3, and 4 is a close type. However, if a circulation system configured to return hydrogen gas to water is provided, an open system can be employed.

According to the secondary battery of the first embodiment, the first electrolyte is contained at least in the positive electrode and contains a lithium salt and an aqueous solvent. The second electrolyte is contained at least in the negative electrode and contains a bis(fluorosulfonyl)imide salt and an aqueous solvent. It is therefore possible to provide a secondary battery having excellent large-current performance, cycle life performance, and storage performance.

Second Embodiment

According to the second embodiment, it is possible to provide a battery module including a secondary battery as a single battery. As the secondary battery, the secondary battery according to the first embodiment can be used.

Examples of the battery module include a battery module including, as a structural unit, a plural of single batteries electrically connected in series or parallel and a battery module including a unit constituted of a plural of single batteries electrically connected in series or a unit constituted of a plural of single batteries electrically connected in parallel. In the battery module, it is also possible to combine plural kinds of single batteries or plural kinds of units.

The battery module may be contained in a housing. As the housing, a metal can formed of aluminum alloy, iron, stainless steel, or the like or a plastic container may be used, for example. A plate thickness of the container is desirably not less than 0.5 mm.

Examples of an embodiment in which a plural of secondary batteries are electrically connected in series or parallel include an embodiment in which a plural of secondary batteries each provided with a container are electrically connected in series or parallel and an embodiment in which a plural of electrode groups contained in a common housing are electrically connected in series or parallel. As a specific example of the former embodiment, positive electrode terminals and negative electrode terminals of a plural of secondary batteries are connected by a metal bus bar (formed of aluminum, nickel, or copper, for example). As a specific example of the latter embodiment, a plural of electrode groups in a state of being electrochemically insulated by a partition are contained in one housing, and these electrode groups are electrically connected in series. When the number of batteries electrically connected in series is in the range of 5 to 7, voltage compatibility with a lead storage battery is improved. In order to further improve the voltage compatibility with the lead storage battery, it is preferable that five or six single batteries are connected in series.

An example of a battery module will be described with reference to FIG. 5. A battery module 31 shown in FIG. 5 includes, as single batteries, a plurality of rectangular secondary batteries (for example, FIGS. 1 and 2) $32_1$ to $32_5$ according to the first embodiment. A positive electrode tab 8 of the battery $32_1$ and a negative electrode tab 9 of the battery $32_2$ located adjacent to the battery $32_1$ are electrically connected by a lead 33. In addition, the positive electrode tab 8 of the battery $32_2$ and the negative electrode tab 9 of the battery $32_3$ located adjacent to the battery $32_2$ are electrically connected by the lead 33. The batteries $32_1$ to $32_5$ are thus electrically connected in series.

According to the battery module of the second embodiment, since the battery module includes the secondary battery according to the first embodiment, it is possible to implement a battery module having excellent cycle life performance, and storage performance, and large-current discharge performance. In addition, the secondary battery according to the first embodiment has satisfactory compatibility with a lead storage battery. It is therefore possible to use the battery module including five secondary batteries connected in series as a power supply alternative to a lead storage battery.

Third Embodiment

According to the third embodiment, it is possible to provide a battery pack including at least one secondary battery according to the first embodiment and a circuit portion configured to control charge and discharge of the secondary battery. A plural of secondary batteries can electrically connected in series, in parallel, or in a combination of series connection and parallel connection. When forming a battery module from a plural of secondary batteries, the battery module according to the second embodiment can be used.

In a battery pack, a circuit portion may be connected to a secondary battery before the battery pack is installed in a vehicle such as an automobile or an electronic device; however, the battery pack of the embodiment includes a battery pack in which a circuit portion of a vehicle such as an automobile is connected to a secondary battery. Examples of the circuit portion include a protective circuit. The protective circuit has a function of controlling charge/discharge of the lithium secondary battery. Alternatively, a circuit included in a device (such as an electronic device and an automobile) using a battery pack as a power supply may be used as a protective circuit of the battery pack.

The battery pack may further comprise an external power distribution terminal. The external power distribution terminal is used for outputting a current from a secondary battery to the outside and/or for inputting a current to the secondary battery. In other words, when the battery pack is used as a power supply, a current is supplied to the outside through an external power distribution terminal. When the battery pack is charged, a charging current (including regenerative energy of the a motive force of a vehicle such as an automobile) is supplied to the battery pack through an external power distribution terminal.

Figure 6:
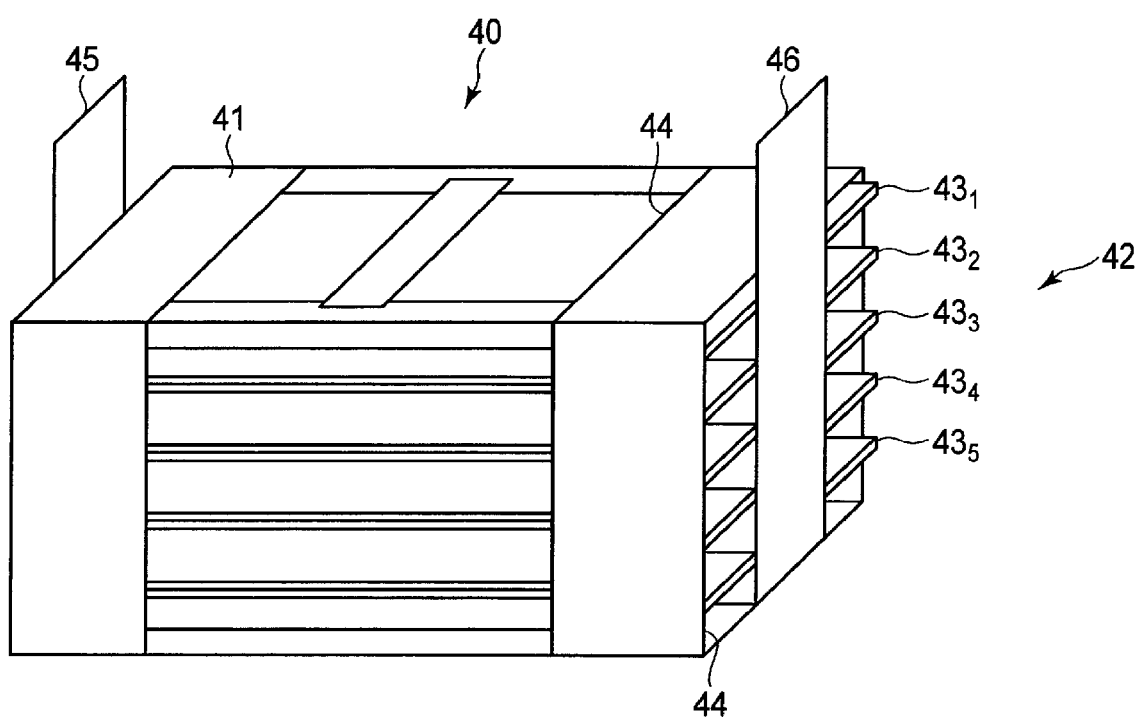
FIG. 6 is a perspective view showing an example of a battery pack according to the embodiment.

An example of the battery pack will be described with reference to FIG. 6. A battery pack 40 includes a battery module formed from secondary batteries shown in FIGS. 3 and 4. The battery pack 40 includes a case 41 and a battery module 42 stored in the case 41. The battery module 42 is formed by electrically connecting a plurality of (for example, five) secondary batteries $43_1$ to $43_5$ in series. The secondary batteries $43_1$ to $43_5$ are stacked in the thickness direction. The case 41 has an opening portion 44 in each of the upper portion and the four side surfaces. Side surfaces of the secondary batteries $43_1$ to $43_5$ from which positive and negative electrode terminals project are exposed to the opening portions 44 of the case 41. An output positive electrode terminal 45 of the battery module 42 has a strip shape. One end of the output positive electrode terminal 45 is electrically connected to the positive electrode terminal of one of the secondary batteries $43_1$ to $43_5$, and the other end projects from the opening portion 44 of the case 41 and projects from the upper portion of the case 41. On the other hand, an output negative electrode terminal 46 of the battery module 42 has a strip shape. One end of the output negative electrode terminal 46 is electrically connected to the negative electrode terminal of one of the secondary batteries $43_1$ to $43_5$, and the other end projects from the opening portion 44 of the case 41 and projects from the upper portion of the case 41.

Another example of the battery pack will be described in detail with reference to FIGS. 7 and 8. A plurality of single batteries 51 each formed from a flat secondary battery are stacked such that negative electrode terminals 52 and positive electrode terminals 53 which extend outward face in the same direction, and fastened by an adhesive tape 54 to form a battery module 55. The single batteries 51 are electrically connected in series, as shown in FIG. 8.

A printed wiring board 56 is arranged to face the side surfaces of the single batteries 51 from which the negative electrode terminals 52 and the positive electrode terminals 53 extend. As shown in FIG. 8, a thermistor 57, a protective circuit 58, and an external power distribution terminal 59 to an external device are mounted on the printed wiring board 56. Note that an insulating plate (not shown) is attached to the surface of the printed wiring board 56 facing the battery module 55 to avoid unwanted connection to the wires of the battery module 55.

A positive electrode lead 60 is connected to the positive electrode terminal 53 located in the lowermost layer of the battery module 55. The distal end of the positive electrode lead 60 is inserted into a positive electrode connector 61 of the printed wiring board 56 and electrically connected to the positive electrode connector 61. A negative electrode lead 62 is connected to the negative electrode terminal 52 located in the uppermost layer of the battery module 55. The distal end of the negative electrode lead 62 is inserted into a negative electrode connector 63 of the printed wiring board 56 and electrically connected to the negative electrode connector 63. The connectors 61 and 63 are connected to the protective circuit 58 via wires 64 and 65 formed on the printed wiring board 56.

The thermistor 57 detects the temperature of each single battery 51 and transmits the detection signal to the protective circuit 58. The protective circuit 58 can disconnect a positive wire 66a and a negative wire 66b between the protective circuit 58 and the external power distribution terminal 59 to an external device under a predetermined condition. The predetermined condition is that, for example, the temperature detected by the thermistor 57 is a predetermined temperature or more. Alternatively, the predetermined condition is detection of over-charge, over-discharge, or overcurrent of the single battery 51. The detection of over-charge or the like is done for each single battery 51 or the battery module 55. If the detection is performed for each single battery 51, a battery voltage may be detected, or a positive electrode potential or negative electrode potential may be detected. In the latter case, a lithium electrode to be used as a reference electrode is inserted into each single battery 51. In FIGS. 7 and 8, a wire 67 used to detect a voltage is connected to each single battery 51, and a detection signal is transmitted to the protective circuit 58 via the wire 67.

A protective sheet 68 made of rubber or resin is arranged on each of three side surfaces of the battery module 55 except the side surface from which the positive electrode terminals 53 and the negative electrode terminals 52 project.

The battery module 55 is stored in a storage container 69 together with the protective sheets 68 and the printed wiring board 56. That is, the protective sheets 68 are arranged on both inner surfaces of the storage container 69 in the long-side direction and on an inner surface in the short-side direction. The printed wiring board 56 is arranged on the inner surface on the opposite side in the short-side direction. The battery module 55 is located in a space surrounded by the protective sheets 68 and the printed wiring board 56. A lid 70 is attached to the upper surface of the storage container 69.

Note that to fix the battery module 55, a heat-shrinkable tape may be used in place of the adhesive tape 54. In this case, the protective sheets are arranged on both side surfaces of the battery module, and the heat-shrinkable tape is wrapped and shrunk by heat to bind the battery module.

Figure 7:
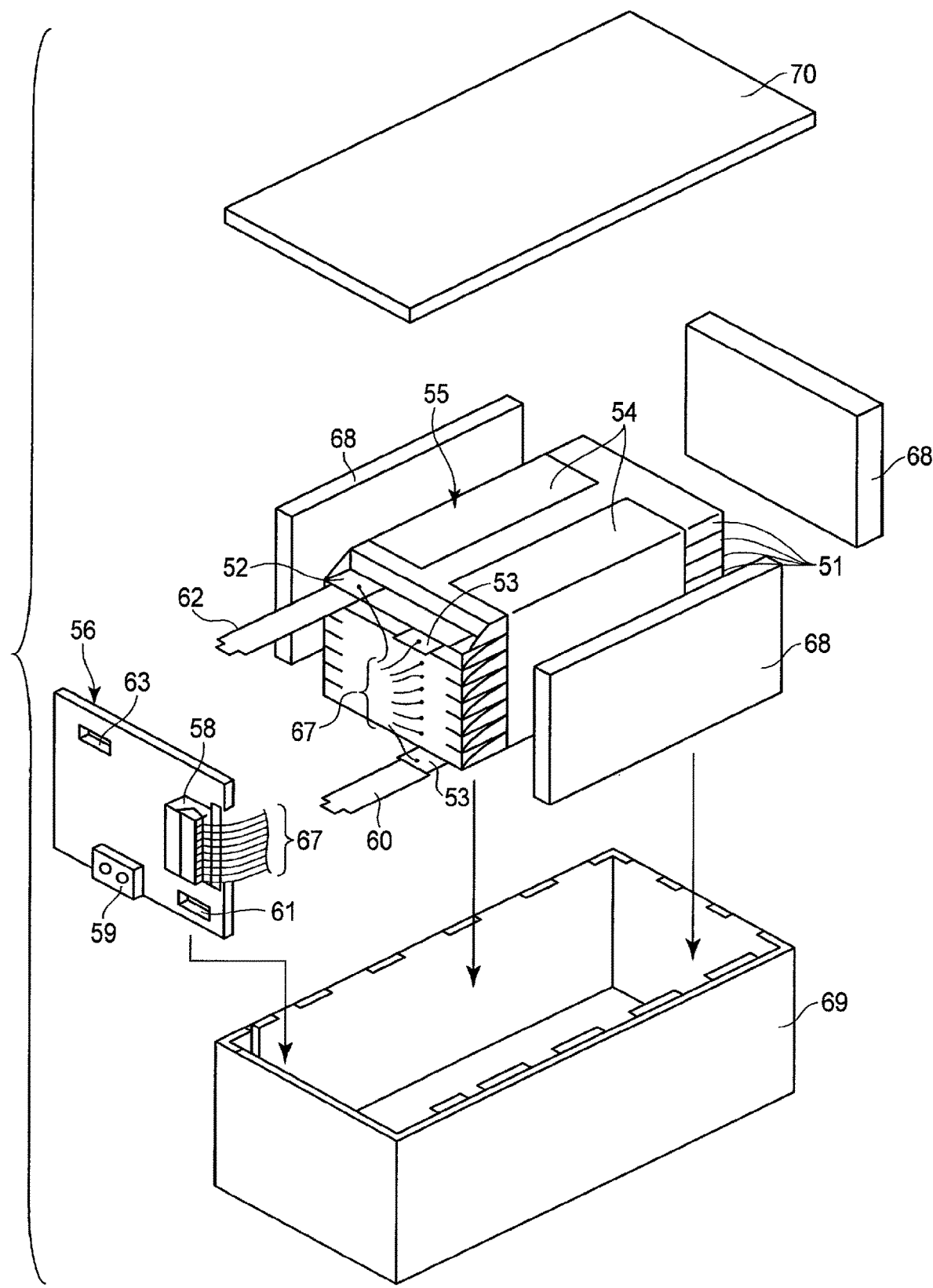
FIG. 7 is an exploded perspective view of another example of the battery pack according to the embodiment.
Figure 8:
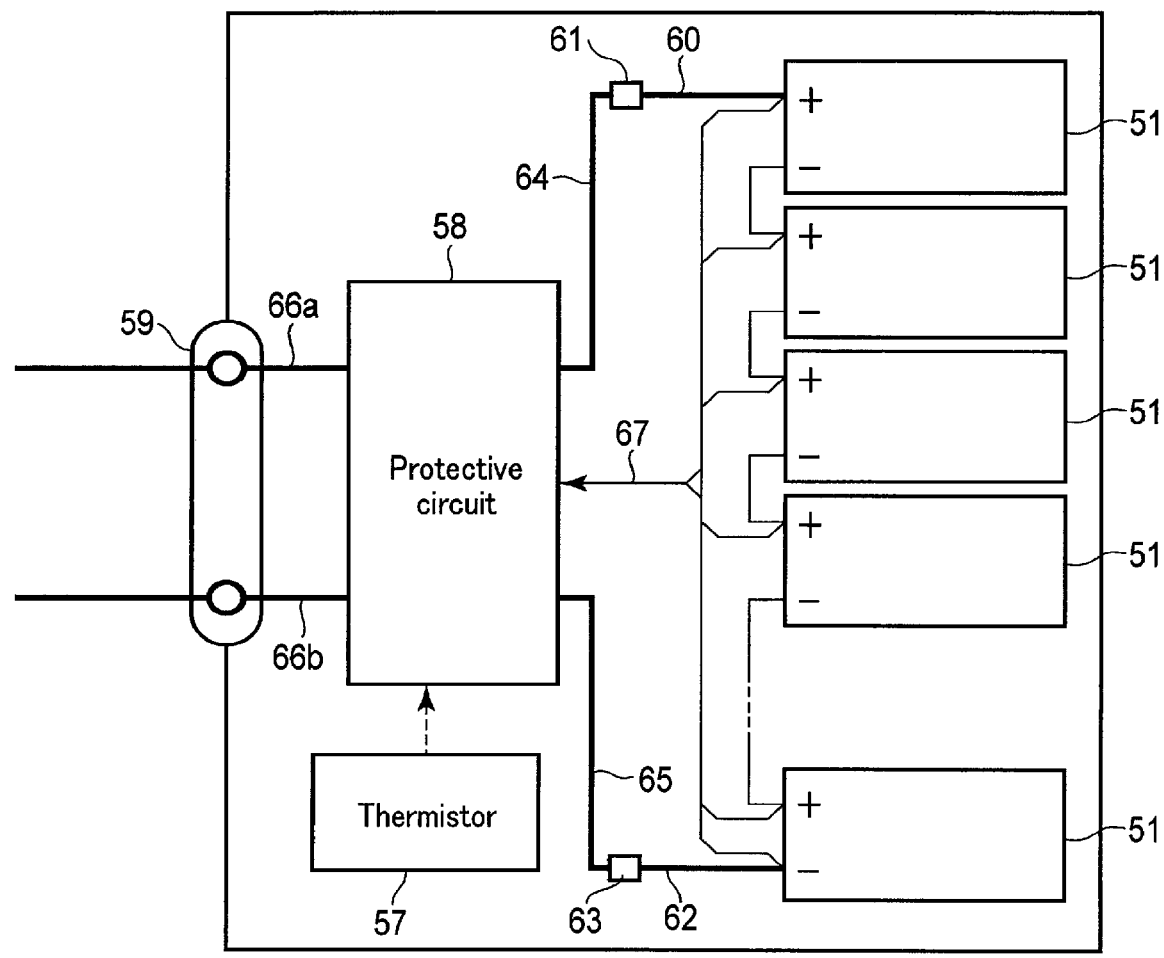
FIG. 8 is a block diagram showing the electric circuit of the battery pack shown in FIG. 7.

FIGS. 7 and 8 show a form in which the single batteries 51 are connected in series. However, the single batteries may be connected in parallel to increase the battery capacity. Assembled battery packs may be connected in series and in parallel.

In FIGS. 7 and 8, an embodiment in which the single batteries 51 are connected in series is described, they may be connected in parallel, for increasing a battery capacity. Assembled battery packs may be connected in series or in parallel.

The embodiments of the battery pack may be appropriately altered depending on the application thereof. The application of the battery pack may include applications in which charging/discharging at high current is desired. Specific examples include a power supply battery for a digital camera, a stationary battery, and a vehicle battery. Examples of vehicles in vehicle batteries include two- or four-wheel hybrid electric vehicles, two- or four-wheel electric vehicles, motor-assisted bicycles, and railway vehicles (railway cars).

In a vehicle such as an automobile including the battery pack according to the third embodiment, the battery pack is configured to use regenerative energy of the motive force of the vehicle, for example.

Figure 9:
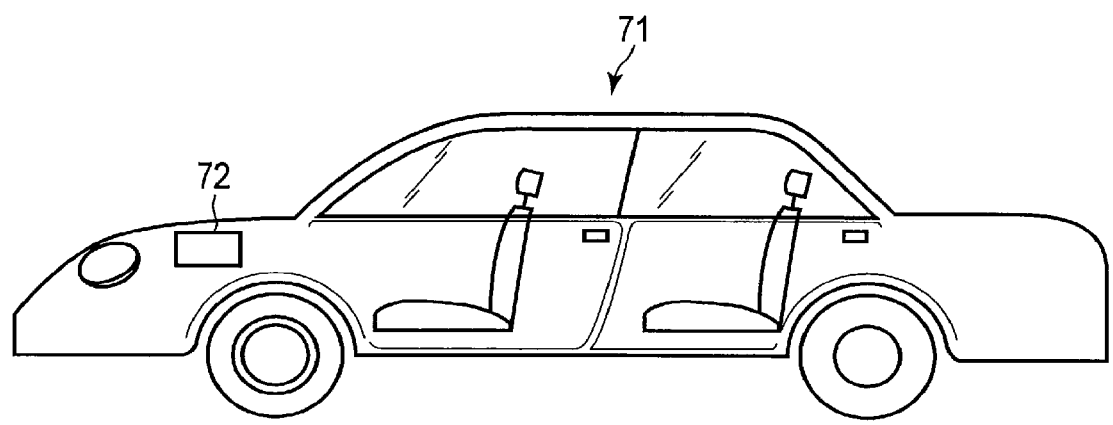
FIG. 9 is a schematic view showing an example of a vehicle including the secondary battery according to the embodiment.

FIG. 9 is a cross-sectional view schematically showing an example of a vehicle according to the third embodiment.

A vehicle 71, shown in FIG. 9 includes a vehicle body and a battery pack 72 according to the embodiment.

The battery pack 72 is installed in an engine compartment located at the front of the vehicle body. The location of installing the battery pack 72 is not particularly limited. The battery pack 72 may be installed in rear sections of the vehicle body, or under a seat. The battery pack 72 may be used as a power source of the vehicle 71. The battery pack 72 can also recover regenerative energy of motive force of the vehicle 71.

FIG. 10 is a view schematically showing an example of the vehicle according to the embodiment. A vehicle 300, shown in FIG. 10, is an electric automobile.

The vehicle 300, shown in FIG. 10, includes a vehicle body, a vehicle power source 301, a vehicle ECU (electric control unit) 380, which is a master controller of the vehicle power source 301, an external terminal (an external power connection terminal) 370, an inverter 340, and a drive motor 345.

The vehicle 300 includes the vehicle power source 301, for example, in the engine compartment, in the rear sections of the automobile body, or under a seat. In FIG. 10, the position of the vehicle power source 301 installed in the vehicle 300 is schematically shown.

The vehicle power source 301 includes plural (for example, three) battery packs 312a, 312b and 312c, BMU (a battery management unit) 311, and a communication bus 310.

The three battery packs 312a, 312b and 312c are electrically connected to each other in series. The battery pack 312a includes a battery module 314a and a battery module monitoring unit (VTM: voltage temperature monitoring) 313a. The battery pack 312b includes a battery module 314b, and a battery module monitoring unit 313b. The battery pack 312c includes a battery module 314c, and a battery module monitoring unit 313c. The battery packs 312a, 312b and 312c can each be independently removed, and may be exchanged by a different battery pack.

Each of the battery modules 314a to 314c includes plural single batteries connected to each other in series. At least one of the plural single batteries is the secondary battery according to the embodiment. The battery modules 314a to 314c each perform charging and discharging through a positive electrode terminal 316 and a negative electrode terminal 317.

In order to collect information concerning security of the vehicle power source 301, the battery management unit 311 performs communication with the battery module monitoring units 313a to 313c and collects information such as voltages or temperatures of the single batteries included in the battery modules 314a to 314c included in the vehicle power source 301.

The communication bus 310 is connected between the battery management unit 311 and the battery module monitoring units 313a to 313c. The communication bus 310 is configured so that multiple nodes (i.e., the battery management unit and one or more battery module monitoring units) share a set of communication lines. The communication bus 310 is, for example, a communication bus configured based on CAN (Control Area Network) standard.

The battery module monitoring units 313a to 313c measure a voltage and a temperature of each single battery in the battery modules 314a to 314c based on communications from the battery management unit 311. It is possible, however, to measure the temperatures only at several points per battery module, and the temperatures of all of the single batteries need not be measured.

The vehicle power source 301 may also have an electromagnetic contactor (for example, a switch unit 333 shown in FIG. 10) for switching connection between the positive electrode terminal and the negative electrode terminal. The switch unit 333 includes a precharge switch (not shown), which is turned on when the battery modules 314a to 314c are charged, and a main switch (not shown), which is turned on when battery output is supplied to a load. The precharge switch and the main switch include a relay circuit (not shown), which is turned on or off based on a signal supplied to a coil located near the switch element.

The inverter 340 converts an inputted DC (direct current) voltage to a three-phase AC (alternate current) high voltage for driving a motor. Three-phase output terminal(s) of the inverter 340 is connected to each three-phase input terminal of the drive motor 345. The inverter 340 controls an output voltage based on control signals from the battery management unit 311 or the vehicle ECU 380, which controls the whole operation of the vehicle.

The drive motor 345 is rotated by electric power supplied from the inverter 340. The rotation is transferred to an axle and driving wheels W, for example, through a differential gear unit.

The vehicle 300 also includes a regenerative brake mechanism, though not shown. The regenerative brake mechanism rotates the drive motor 345 when the vehicle 300 is braked, and converts kinetic energy into regenerative energy, as electric energy. The regenerative energy, recovered in the regenerative brake mechanism, is inputted into the inverter 340 and converted to direct current. The direct current is inputted into the vehicle power source 301.

One terminal of a connecting line L1 is connected through a current detector (not shown) in the battery management unit 311 to the negative electrode terminal 317 of the vehicle power source 301. The other terminal of the connecting line L1 is connected to a negative electrode input terminal of the inverter 340.

One terminal of a connecting line L2 is connected through the switch unit 333 to the positive electrode terminal 316 of the vehicle power source 301. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the whole vehicle. Data concerning the security of the vehicle power source 301, such as a remaining capacity of the vehicle power source 301, are transferred between the battery management unit 311 and the vehicle ECU 380 through communication lines.

In a vehicle including the secondary battery according to the embodiment, each of the battery packs 312a, 312b, and 312c is excellent in cycle life performance, storage performance, and large, current discharge performance, and therefore, a vehicle having excellent charge/discharge performance and high reliability can be obtained. Further, since each of the battery packs has a reasonable cost and is highly safe, it is possible to reduce the cost of the vehicle and improve the safety.

In the vehicle including the secondary battery according to the embodiment, each of the battery packs 312a, 312b, and 312c has excellent cycle life performance, storage performance, and large-current discharge performance. Hence, a reliable vehicle having excellent charge-and-discharge performance can be obtained. In addition, each battery pack is inexpensive and safe. It is therefore possible to suppress the cost of the vehicle and increase the safety.

According to the battery pack of the third embodiment, since the battery pack includes the secondary battery of the first embodiment, it is possible to implement a battery pack having excellent cycle life performance, storage performance, and large-current discharge performance. Hence, according to the embodiment, it is possible to provide a battery module and a battery pack suitable as a power supply alternative to a lead storage battery that is used as a starter power supply for a vehicle, or as an onboard secondary battery mounted in a hybrid car.

Examples of the embodiments will be described below in detail with reference to the accompanying drawings. However, the each embodiment is not limited to the examples to be described below.

Example 1

A lithium manganese oxide ($LiMn_2O_4$) having a spinel structure and an average particle size of 5 μm was used as a positive electrode active material. Then, 3 wt % of vapor-grown carbon fiber having a fiber diameter of 0.1 μm and 5 wt % of graphite powder, both serving as electroconductive agents, and 5 wt % of polytetrafluoroethylene (PTFE) serving as a binder were mixed with the positive electrode active material, and the mixture was dispersed in water to prepare a slurry. The mixing ratio of the electroconductive agents and the binder is a value in a case in which the sum of the positive electrode active material, the electroconductive agent, and the binder is defined as 100 wt %. The obtained slurry was applied to both surfaces of a nickel foil having a thickness 10 μm and dried. Pressing was performed to form a positive electrode active material-containing layer on both surfaces of the nickel foil, thereby producing a positive electrode having an electrode density of 2.2 g/cm$^3$. The thickness of each positive electrode active material-containing layer was 43 μm.

In addition, $Li_4Ti_5O_{12}$ powder having an average secondary particle size (average secondary particle diameter) of 10 μm, zinc powder having an average particle size of 10 μm, and tetrafluoroethylene (PTFE) serving as a binder were mixed at a weight ratio of 92:5:3 and dispersed in water. The mixture was stirred using a ball mill at a rotational speed of 1000 rpm for a stirring time of 2 hours to prepare a slurry. The obtained slurry was applied to a nickel foil having a thickness 10 μm and dried. Heat-press was performed to form a negative electrode active material-containing layer on both surfaces of the nickel foil, thereby producing a negative electrode having an electrode density of 2.2 g/cm$^3$. The thickness of each negative electrode active material-containing layer was 59 μm.

As a second electrolyte, 8 mol/L of Li[(FSO$_2$)$_2$N] was dissolved in water to prepare an aqueous solution with a mole fraction (M$_1$/M$_2$) of 1.35. Lithium polyacrylate was added to the aqueous solution such that the amount of lithium polyacrylate in the second electrolyte became 3 wt %. Then, after the negative electrode was impregnated with the aqueous solution, a heat treatment was performed for this at 60° C. for 24 hours, thereby obtaining of a gel of the second electrolyte.

As a porous separator, nonwoven fabric made of cellulose fiber with an average fiber diameter of 1 μm and having a thickness of 20 μm and a porosity of 65% was prepared. The porous separator was overlaid on the positive electrode to cover the positive electrode. The negative electrode was overlaid such that its negative electrode active material-containing layer faced the positive electrode active material-containing layer with the porous separator interposing therebetween. These were spirally wound to produce an electrode group. At this time, the electrode width (the length of the short side) of the positive electrode active material-containing layer was 50 mm, and the electrode width (the length of the short side) of the negative electrode active material-containing layer was 51 mm.

The electrode group was pressed into a flat shape. The electrode group was stored in a container formed from a thin metal can made of stainless steel having a thickness of 0.25 mm. This metal can includes a valve configured to leak a gas when the internal pressure becomes 2 atm or more.

On the other hand, as a first electrolyte, 2 mol of Li$_2$SO$_4$ was dissolved in 1 L of water to prepare an aqueous solution. Table 1 shows the pH of the aqueous solution. The electrolytic solution was poured to the electrode group in the container and impregnated in the positive electrode and the porous separator. A thin secondary battery having the structure shown in FIG. 1 described above and having a thickness of 16 mm, a width of 40 mm, and a height of 60 mm was produced.

Examples 2 to 5

Thin secondary batteries were produced in accordance with the same procedure as in Example 1 except that the concentration of Li[(FSO$_2$)$_2$N] in the aqueous solution was changed as shown in Table 3, and the water mole fraction (M$_1$/M$_2$) of the second electrolyte was changed as shown in Table 3.

Examples 6 to 10

Thin secondary batteries were produced in accordance with the same procedure as in Example 1 except that an aqueous solution of Li[(FSO$_2$)$_2$N] with a concentration shown in Table 3 and an aqueous solution of bis(fluorosulfonyl)imide salt with a concentration shown in Table 3 were mixed at a volume ratio shown in Table 3.

Examples 11 to 18

Thin secondary batteries were produced in accordance with the same procedure as in Example 1 except that the composition and average particle size of the positive electrode active material, the composition and average particle size of the negative electrode active material, the aqueous solution composition of the first electrolyte, the pH of the first electrolyte, the aqueous solution composition of the second electrolyte, and the water mole fraction of the second electrolyte were changed as shown in Tables 1 and 3.

Example 19

Cellulose nanofiber was used in place of lithium polyacrylate and added such that the amount of the polymeric material in the second electrolyte became 3 wt %. A thin secondary battery was produced in accordance with the same procedure as in Example 1 except this.

Comparative Examples 1 to 6

Thin secondary batteries were produced in accordance with the same procedure as in Example 1 except that the composition and average particle size of the positive electrode active material, the composition and average particle size of the negative electrode active material, the aqueous solution composition of the first electrolyte, the pH of the first electrolyte, the aqueous solution composition of the second electrolyte, and the water mole fraction of the second electrolyte were changed as shown in Tables 2 and 4. Note that the water mole fraction in Comparative Examples 1 to 6 is the ratio of the number of mole of water in the second electrolyte with respect to the number of mole of cation of the lithium salt in the second electrolyte (the number of mole of water/the number of mole of lithium salt cation).

Each obtained secondary battery was charged up to 2.7 V at 25° C. with a constant current of 3 A (corresponding to 1 C) and then discharged to 1.5 V with 3 A, and the discharge capacity at this time was measured. The obtained discharge capacity is shown in Tables 5 and 6 as a 25° C. discharge capacity.

The cycle test of each secondary battery was conducted under the following conditions. A charge-and-discharge cycle for charging the secondary battery up to 2.7 V at 25° C. with a constant current of 3 A and then discharging it to 1.5 V with 3 A was repeated. The number of cycles with which the discharge capacity had a value corresponding to 80% of the initial capacity is shown in Tables 5 and 6 as a cycle life.

The large-current discharge performance test of each secondary battery was conducted under the following conditions. The secondary battery was charged up to 2.7 V with 3 A and then discharged to 1.5 V with 30 A, and the discharge capacity at this time was measured. Defining a discharge capacity obtained by charging the secondary battery up to 2.7 V with 3 A and then discharging it to 1.5 V with 3 A as 100%, a value representing an obtained discharge capacity is shown in Tables 5 and 6 as a large current discharge capacity retention ratio.

The storage test of each secondary battery was conducted under the following conditions. A self-discharge ratio after the secondary battery was charged up to 2.7 V with 3 A and then left stand at 30° C. for one week was obtained. Defining the discharge capacity before the battery is left stand as 100%, the value of a discharge capacity after the battery was left is shown in Tables 5 and 6 as a self-discharge ratio.

TABLE 1

|  | Positive Electrode Active Material Composition | Positive Electrode Active Material Average Particle Size(μm) | Negative Electrode Active Material Composition | Negative Electrode Active Material Average Particle Size(μm) |
| --- | --- | --- | --- | --- |
| Example 1 | $LiMn_2O_4$ | 5 | $Li_4Ti_5O_{12}$ | 10 |
| Example 2 | $LiMn_2O_4$ | 5 | $Li_4Ti_5O_{12}$ | 10 |
| Example 3 | $LiMn_2O_4$ | 5 | $Li_4Ti_5O_{12}$ | 10 |
| Example 4 | $LiMn_2O_4$ | 5 | $Li_4Ti_5O_{12}$ | 10 |
| Example 5 | $LiMn_2O_4$ | 5 | $Li_4Ti_5O_{12}$ | 10 |
| Example 6 | $LiMn_2O_4$ | 5 | $Li_4Ti_5O_{12}$ | 10 |
| Example 7 | $LiMn_2O_4$ | 5 | $Li_4Ti_5O_{12}$ | 10 |
| Example 8 | $LiMn_2O_4$ | 5 | $Li_4Ti_5O_{12}$ | 10 |
| Example 9 | $LiMn_2O_4$ | 5 | $Li_4Ti_5O_{12}$ | 10 |
| Example 10 | $LiMn_2O_4$ | 5 | $Li_4Ti_5O_{12}$ | 10 |
| Example 11 | $LiMn_2O_4$ | 5 | $Li_4Ti_5O_{12}$ | 10 |
| Example 12 | $LiMn_2O_4$ | 5 | $Li_4Ti_5O_{12}$ | 10 |
| Example 13 | $LiMn_2O_4$ | 5 | $Li_4Ti_5O_{12}$ | 10 |
| Example 14 | $LiMn_2O_4$ | 5 | $TiNb_2O_7$ | 10 |
| Example 15 | $LiMn_2O_4$ | 5 | $TiO_2$ anatase | 10 |
| Example 16 | $LiMn_2O_4$ | 5 | $Li_4Ti_5O_{12}$ | 10 |
| Example 17 | $LiNi_{0.8}Co_{0.1}Mn_{0.1}O_2$ | 10 | $TiNb_2O_7$ | 10 |
| Example 18 | $LiMn_2O_4$ | 5 | $Li_2NaTi_{5.25}Nb_{0.75}O_{14}$ | 10 |
| Example 19 | $LiMn_2O_4$ | 5 | $Li_4Ti_5O_{12}$ | 10 |

TABLE 2

|  | Positive Electrode Active Material | Positive Electrode Active Material Average Particle Size(μm) | Negative Electrode Active Material | Negative Electrode Active Material Average Particle Size(μm) |
| --- | --- | --- | --- | --- |
| Comparative Example 1 | $LiMn_2O_4$ | 5 | $Li_4Ti_5O_{12}$ | 10 |
| Comparative Example 2 | $LiMn_2O_4$ | 5 | $Li_4Ti_5O_{12}$ | 10 |
| Comparative Example 3 | $LiMn_2O_4$ | 5 | $Li_4Ti_5O_{12}$ | 10 |
| Comparative Example 4 | $LiMn_2O_4$ | 5 | $Li_4Ti_5O_{12}$ | 10 |
| Comparative Example 5 | $LiMn_2O_4$ | 5 | $Li_4Ti_5O_{12}$ | 10 |
| Comparative Example 6 | $LiMn_2O_4$ | 5 | $Li_4Ti_5O_{12}$ | 10 |

TABLE 3

|  | First Electrolyte | pH of First Electrolyte | Second Electrolyte | Water Mole Fraction of Second Electrolyte ($M_1/M_2$) |
| --- | --- | --- | --- | --- |
| Example 1 | 2 mol/L $Li_2SO_4$ | 4.5 | 8 mol/L $Li\{(FSO_2)_2N\}$ | 1.35 |
| Example 2 | 2 mol/L $Li_2SO_4$ | 4.5 | 6 mol/L $Li\{(FSO_2)_2N\}$ | 1.8 |
| Example 3 | 2 mol/L $Li_2SO_4$ | 4.5 | 4 mol/L $Li\{(FSO_2)_2N\}$ | 2.7 |
| Example 4 | 2 mol/L $Li_2SO_4$ | 4.5 | 2.7 mol/L $Li\{(FSO_2)_2N\}$ | 4.0 |
| Example 5 | 2 mol/L $Li_2SO_4$ | 4.5 | 2.16 mol/L $Li\{(FSO_2)_2N\}$ | 5.0 |
| Example 6 | 2 mol/L $Li_2SO_4$ | 4.5 | 7.2 mol/L of $Li\{(FSO_2)_2N\}$ and 3.6 mol/L of $Na\{(FSO_2)_2N\}$ Were Mixed at Volume Ratio of 2:1 | 1.0 |
| Example 7 | 2 mol/L $Li_2SO_4$ | 4.5 | 5.33 mol/L of $Li\{(FSO_2)_2N\}$ and 2.67 mol/L of $K\{(FSO_2)_2N\}$ Were Mixed at Volume Ratio of 2:1 | 1.35 |
| Example 8 | 2 mol/L $Li_2SO_4$ | 4.5 | 3.2 mol/L of $Li\{(FSO_2)_2N\}$ and 0.8 mol/L of $Mg\{(FSO_2)_2N\}_2$ Were Mixed at Volume Ratio of 4:1 | 2.7 |
| Example 9 | 2 mol/L $Li_2SO_4$ | 4.5 | 3.2 mol/L of $Li\{(FSO_2)_2N\}$ and 0.8 mol/L of $Zn\{(FSO_2)_2N\}_2$ Were Mixed at Volume Ratio of 4:1 | 2.7 |
| Example 10 | 2 mol/L $Li_2SO_4$ | 4.5 | 3.2 mol/L of $Li\{(FSO_2)_2N\}$ and 0.8 mol/L of $Al\{(FSO_2)_2N\}_3$ Were Mixed at Volume Ratio of 4:1 | 2.7 |
| Example 11 | 3 mol/L LiCl | 3.5 | 5.4 mol/L $Li\{(FSO_2)_2N\}$ | 2.0 |
| Example 12 | 2 mol/L $LiNO_3$ | 3.5 | 8 mol/L $Li\{(FSO_2)_2N\}$ | 1.35 |
| Example 13 | 2 mol/L LiOH | 14 | 6 mol/L $Li\{(FSO_2)_2N\}$ | 1.8 |
| Example 14 | 1 mol/L $Li_2SO_4$ | 5 | 6 mol/L $Li\{(FSO_2)_2N\}$ | 1.8 |
| Example 15 | 1 mol/L $Li_2SO_4$ | 5 | 6 mol/L $Li\{(FSO_2)_2N\}$ | 1.8 |
| Example 16 | 1 mol/L $Li\{(FSO_2)_2N\}$ | 6 | 6 mol/L $Li\{(FSO_2)_2N\}$ | 1.8 |

TABLE 3-continued

|  | First Electrolyte | pH of First Electrolyte | Second Electrolyte | Water Mole Fraction of Second Electrolyte ($M_1/M_2$) |
|---|---|---|---|---|
| Example 17 | 1 mol/L $Li_2SO_4$ | 5 | 6 mol/L $Li\{(FSO_2)_2N\}$ | 1.8 |
| Example 18 | 6 mol/L LiCl | 3 | 6 mol/L $Li\{(FSO_2)_2N\}$ | 1.8 |
| Example 19 | 6 mol/L LiCl | 3 | 6 mol/L $Li\{(FSO_2)_2N\}$ | 1.8 |

TABLE 4

|  | First Electrolyte | pH of First Electrolyte | Second Electrolyte | Wate Mole Fraction of Second Electrolyte |
|---|---|---|---|---|
| Comparative Example 1 | 2 mol/L $Li_2SO_4$ | 4.5 | 1.08 mol/L $Li_2SO_4$ | 10 |
| Comparative Example 2 | 2 mol/L $Li_2SO_4$ | 4.5 | 1.8 mol/L LiCl | 6.0 |
| Comparative Example 3 | 2 mol/L $Li_2SO_4$ | 4.5 | 1.8 mol/L $LiNO_3$ | 6.0 |
| Comparative Example 4 | 2 mol/L $Li_2SO_4$ | 4.5 | 1.8 mol/L $LiNO_3$ | 6.0 |
| Comparative Example 5 | 2 mol/L $Li_2SO_4$ | 4.5 | 1.8 mol/L $Li\{(CF_3SO_2)_2N\}$ | 6.0 |
| Comparative Example 6 | 2 mol/L $Li\{(CF_3SO_2)_2N\}$ | 6 | 1.8 mol/L $Li\{(CF_3SO_2)_2N\}$ | 6.0 |

TABLE 5

|  | 25° C. Discharge Capacity (mAh) | Large Current Discharge Capacity Retention Ratio(%) | Cycle Life (Times) | 30° C. Storage Discharge Ratio(%) |
|---|---|---|---|---|
| Example 1 | 2500 | 80 | 3000 | 4 |
| Example 2 | 2700 | 85 | 2500 | 6 |
| Example 3 | 2700 | 90 | 2200 | 10 |
| Example 4 | 2600 | 80 | 2100 | 13 |
| Example 5 | 2500 | 75 | 2000 | 15 |
| Example 6 | 2800 | 90 | 3200 | 3 |
| Example 7 | 2700 | 90 | 3000 | 6 |
| Example 8 | 2700 | 85 | 3100 | 4 |
| Example 9 | 2800 | 85 | 3200 | 3 |
| Example 10 | 2600 | 85 | 2500 | 6 |
| Example 11 | 2600 | 90 | 2200 | 10 |
| Example 12 | 2400 | 80 | 2000 | 10 |
| Example 13 | 2500 | 90 | 2500 | 8 |
| Example 14 | 3000 | 80 | 2000 | 10 |
| Example 15 | 2500 | 80 | 2000 | 8 |
| Example 16 | 2700 | 85 | 2600 | 6 |
| Example 17 | 3000 | 70 | 3000 | 8 |
| Example 18 | 2000 | 80 | 2000 | 10 |
| Example 19 | 2600 | 80 | 2500 | 5 |

TABLE 6

|  | 25° C. Discharge Capacity (mAh) | Large Current Discharge Capacity Retention Ratio(%) | Cycle Life (Times) | 30° C. Storage Discharge Ratio(%) |
|---|---|---|---|---|
| Comparative Example 1 | 1000 | 30 | 200 | 40 |
| Comparative Example 2 | 1200 | 40 | 300 | 50 |
| Comparative Example 3 | 800 | 30 | 100 | 60 |
| Comparative Example 4 | 500 | 30 | 100 | 60 |
| Comparative Example 5 | 1000 | 40 | 500 | 30 |
| Comparative Example 6 | 1000 | 20 | 500 | 30 |

As is apparent from Tables 1 to 6, the secondary batteries of Examples 1 to 19 have more excellent 25° C. discharge capacity, large-current discharge capacity retention ratio, cycle life, and self-discharge ratio as compared to Comparative Examples 1 to 6.

As can be seen from comparison between Example 1 and Example 7 and comparison between Example 3 and Examples 8 to 10, when $Li[(FSO_2)_2N]$ and a bis(fluorosulfonyl)imide metal salt represented by $M[(FSO_2)_2N]_n$ (M is one or two or more element selected from the group consisting of Na, K, Mg, Zn, and Al, and n is 1, 2, or 3) are used, the large-current discharge capacity retention ratio, cycle life, or self-discharge ratio of a secondary battery is improved.

As is apparent from comparison between Example 1 and Examples 11 to 19, the object of the embodiments can be achieved even when the type of lithium salt in the first electrolyte or the type of positive electrode active material or negative electrode active material is changed from that in Example 1.

The following points were confirmed by performing chemical analysis such as elementary analysis for the electrode group of the secondary battery of each example. The first electrolyte existed separately from the second electrolyte, and the first electrolyte mostly existed in the positive electrode and the porous separator. In addition, the second electrolyte existed in the negative electrode.

The secondary battery of at least one of the embodiments and examples includes the first electrolyte that is contained at least in the positive electrode and contains a lithium salt and an aqueous solvent, and the second electrolyte that is contained at least in the negative electrode and contains a bis(fluorosulfonyl)imide salt and an aqueous solvent. It is therefore possible to provide a secondary battery having excellent large-current performance, cycle performance, and storage performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
    a positive electrode;
    a negative electrode;
    a separator arranged at least between the positive electrode and the negative electrode;
    a first electrolyte that is contained at least in the positive electrode and comprises a lithium salt and an aqueous solvent; and
    a second electrolyte that is contained at least in the negative electrode and comprises a bis(fluorosulfonyl) imide salt and an aqueous solvent,
    wherein the second electrolyte has one of a gel form and a solid form.

2. The battery of claim 1, wherein the bis(fluorosulfonyl) imide salt includes lithium bis(fluorosulfonyl)imide and a bis(fluorosulfonyl)imide metal salt represented by $M[(FSO_2)_2N]_n$ (M is at least one element selected from the group consisting of Na, K, Mg, Zn, and Al, and n is 1, 2, or 3).

3. The battery of claim 1, wherein the lithium salt is at least one salt selected from the group consisting of LiCl, LiOH, $LiNO_3$, $Li[(FSO_2)_2N]$, and $Li_2SO_4$, and the first electrolyte is an aqueous solution containing the lithium salt at a concentration of not less than 1 mol/L.

4. The battery of claim 3, wherein a pH value of the first electrolyte is from 2 to 14.

5. The battery of claim 1, wherein the second electrolyte satisfies $$1 \le (M_1/M_2) \le 5 \quad (1)$$

where $M_1$ is a number of mole of water in the second electrolyte, and $M_2$ is a number of mole of cation of the bis(fluorosulfonyl)imide salt in the second electrolyte.

6. The battery of claim 1, wherein the negative electrode comprises an active material containing a titanium-containing oxide.

7. The battery of claim 6, wherein the negative electrode comprises a first element comprising at least one element selected from the group consisting of B, P, Al, La, Zr, Ge, Ti, Zn, Sn, Ga, Pb, In Bi, and Tl.

8. A battery pack comprising the secondary battery of claim 1.

9. The battery pack of claim 8, wherein the secondary battery comprises a plurality of secondary batteries, and the plural of secondary batteries are electrically connected in series, in parallel, or in a combination of series connection and parallel connection.

10. The battery pack of claim 8, further comprising a protective circuit and an external power distribution terminal.

11. A vehicle comprising the battery pack of claim 8.

12. The vehicle of claim 11, which comprises a mechanism configured to convert kinetic energy of the vehicle into regenerative energy.

13. The battery of claim 1, wherein the second electrolyte has the gel form, and comprises a polymeric material.

14. The battery of claim 13, wherein the polymeric material comprises at least one selected from the group consisting of polyacrylate, polyvinylidene fluoride, polyacrylonitrile, polyethylene oxide, and cellulose nanofiber.

15. The battery of claim 13, wherein a content of the polymeric material in the second electrolyte falls within the range of 0.5 wt % to 10 wt %.

* * * * *